US010771957B2

(12) United States Patent
Sakoda et al.

(10) Patent No.: US 10,771,957 B2
(45) Date of Patent: *Sep. 8, 2020

(54) WIRELESS COMMUNICATION APPARATUS, COMMUNICATION SYSTEM AND WIRELESS COMMUNICATION APPARATUS CONTROL METHOD TO EXCHANGE SERVICES

(71) Applicant: SONY CORPORATION, Tokyo (JP)

(72) Inventors: Kazuyuki Sakoda, Chiba (JP); Takushi Kunihiro, Tokyo (JP); Yoichiro Sako, Tokyo (JP); Kouichirou Ono, Tokyo (JP); Makoto Akagi, Kanagawa (JP); Katsuhito Ishida, Kanagawa (JP); Mitsuru Takehara, Tokyo (JP); Kento Suzuki, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 16/424,737

(22) Filed: May 29, 2019

(65) Prior Publication Data

US 2019/0281444 A1 Sep. 12, 2019

Related U.S. Application Data

(63) Continuation of application No. 15/805,187, filed on Nov. 7, 2017, now Pat. No. 10,356,607, which is a (Continued)

(30) Foreign Application Priority Data

Jan. 28, 2013 (JP) ................................. 2013-013561

(51) Int. Cl.
*H04W 8/20* (2009.01)
*H04W 12/08* (2009.01)
(Continued)

(52) U.S. Cl.
CPC .......... *H04W 8/20* (2013.01); *H04W 12/003* (2019.01); *H04W 12/08* (2013.01); *H04W 76/11* (2018.02);
(Continued)

(58) Field of Classification Search
CPC ... H04L 67/1093; H04L 67/30; H04L 67/322; H04L 67/108; H04L 67/104;
(Continued)

(56) References Cited

U.S. PATENT DOCUMENTS

2006/0250994 A1  11/2006  Sasaki et al.
2007/0030824 A1  2/2007  Ribaudo et al.
(Continued)

FOREIGN PATENT DOCUMENTS

CN      1842014 A    10/2006
CN    101146126 A     3/2008
(Continued)

OTHER PUBLICATIONS

Notice of Allowance and Fees Due for U.S. Appl. No. 15/805,187, dated Mar. 7, 2019, 08 pages.
(Continued)

*Primary Examiner* — Jung Liu
(74) *Attorney, Agent, or Firm* — Chip Law Group

(57) ABSTRACT

There is provided a wireless communication apparatus that includes a communication unit that uses wireless communication to transmit and receive data related to a service provided by at least one of the wireless communication apparatus and another wireless communication apparatus with other wireless communication apparatuses present within a designated range, and a control unit that associates service information for identifying the service with user information for identifying a user using a wireless commu-
(Continued)

nication apparatus that provides the service, and include and transmit the associated information in the data.

10 Claims, 19 Drawing Sheets

Related U.S. Application Data continuation of application No. 14/761,103, filed as application No. PCT/JP2013/079966 on Nov. 6, 2013, now Pat. No. 9,826,394.

(51) Int. Cl.
| | | |
|---|---|---|
| *H04W 76/11* | (2018.01) | |
| *H04W 12/00* | (2009.01) | |
| *H04W 84/18* | (2009.01) | |
| *H04L 29/06* | (2006.01) | |
| *H04W 4/80* | (2018.01) | |

(52) U.S. Cl.
CPC .............. *H04L 63/101* (2013.01); *H04W 4/80* (2018.02); *H04W 84/18* (2013.01)

(58) Field of Classification Search
CPC . H04L 67/1063; H04L 67/1068; H04L 67/02; H04W 8/005; H04W 84/12; H04W 76/023; H04W 88/06
See application file for complete search history.

(56) References Cited

U.S. PATENT DOCUMENTS

| | | | | |
|---|---|---|---|---|
| 2007/0050493 | A1* | 3/2007 | Sienel ................... | H04L 67/104 |
| | | | | 709/223 |
| 2007/0094279 | A1* | 4/2007 | Mittal ................. | H04L 67/1063 |
| 2007/0286134 | A1 | 12/2007 | Kirke | |
| 2008/0132206 | A1 | 6/2008 | Suzuki | |
| 2008/0176655 | A1* | 7/2008 | James ................. | G06F 19/3475 |
| | | | | 463/42 |
| 2011/0153773 | A1* | 6/2011 | Vandwalle ............ | H04W 48/08 |
| | | | | 709/217 |
| 2011/0294474 | A1* | 12/2011 | Barany ................. | H04W 8/005 |
| | | | | 455/414.1 |
| 2012/0134349 | A1* | 5/2012 | Jung ..................... | H04W 8/005 |
| | | | | 370/338 |
| 2013/0318347 | A1* | 11/2013 | Moffat ................ | H04L 63/0435 |
| | | | | 713/168 |
| 2014/0010107 | A1* | 1/2014 | Chikkappa .............. | H04W 4/06 |
| | | | | 370/254 |
| 2014/0044114 | A1 | 2/2014 | Lee et al. | |

FOREIGN PATENT DOCUMENTS

| | | |
|---|---|---|
| CN | 101741916 A | 6/2010 |
| EP | 1370050 A1 | 12/2003 |
| JP | 2006-276943 A | 10/2006 |
| JP | 2007-102619 A | 4/2007 |
| JP | 2008-099245 A | 4/2008 |
| JP | 2009-239385 A | 10/2009 |
| KR | 10-2006-0103837 A | 10/2006 |

OTHER PUBLICATIONS

Non-Final Office Action for U.S. Appl. No. 15/805,187, dated Sep. 5, 2018, 11 pages.
Office Action for CN Patent Application No. 201380071051.7, dated Oct. 29, 2018, 08 pages of Office Action and 13 pages of English Translation.
Office Action for CN Patent Application No. 201380071051.7, dated Nov. 10, 2017, 10 pages of Office Action and 12 pages of English Translation.
Extended European Search Report of EP Patent Application No. 13872508.0, dated Aug. 26, 2016, 07 pages.
Office Action for CN Patent Application No. 201380071051.7, dated Mar. 15, 2017, 12 pages of Office Action and 06 pages of English Translation.
Office Action for JP Patent Application No. 2014-558442, dated Aug. 8, 2017, 05 pages of Office Action and 04 pages of English Translation.
International Search Report and Written Opinion of PCT Application No. PCT/JP2013/079966, dated Feb. 10, 2014, 06 pages of English Translation and 06 pages of ISRWO.
International Preliminary Report on Patentability of PCT Application No. PCT/JP2013/079966, dated Aug. 6, 2015, 07 pages of English Translation and 05 pages of IPRP.
Non Final Office Action for U.S. Appl. No. 14/761,103, dated Oct. 26, 2016, 20 pages.
Final Office Action for U.S. Appl. No. 14/761,103, dated Apr. 26, 2017, 26 pages.
Notice of Allowance for U.S. Appl. No. 14/761,103, dated Jul. 20, 2017, 08 pages.
Corrected Notice of Allowability for U.S. Appl. No. 14/761,103, dated Sep. 5, 2017, 05 pages.

* cited by examiner

FRIEND LIST MANAGEMENT TABLE
320

| ID CLASS | USER ID | COMMUNICATION HISTORY INFORMATION |
|---|---|---|
| 0x0001 | AAA@ccc. org | 20130102… |
| | BBB@ddd. jp | 20130102… |
| | CCC@fff. com | 20130102… |
| | ⋮ | ⋮ |
| 0x001e | ⋮ | ⋮ |
| 0x003f | ⋮ | ⋮ |
| ⋮ | ⋮ | ⋮ |

BLOCKED LIST MANAGEMENT TABLE
330

| ID CLASS | USER ID |
|---|---|
| 0x0001 | xxx@ccc.com |
|  | YYY@ddd.jp |
|  | ZZZ@fff.com |
|  | ⋮ |
| 0x001e | ⋮ |
| 0x003f | ⋮ |
| ⋮ | ⋮ |

FIG. 8

| | | |
|---|---|---|
| 163 | SERVICE TYPE | INFORMATION FOR IDENTIFYING SERVICE DETAILS (SUCH AS CONTENT DELIVERY). MAY ALSO INCLUDE COUNT INDICATING HOW MANY MORE TIMES DISCOVERY INFORMATION MAY BE FORWARDED. ON BASIS OF SERVICE TYPE, WIRELESS COMMUNICATION APPARATUS THAT RECEIVES DISCOVERY INFORMATION MAY DECIDE WHETHER OR NOT TO RECEIVE SERVICE IDENTIFIED BY SERVICE TYPE. |
| 164 | CONTENT ID | ID FOR IDENTIFYING SERVICE. WIRELESS COMMUNICATION APPARATUS THAT TRANSMITS OR RECEIVES DISCOVERY INFORMATION MANAGES RECEIVING OF SERVICE IDENTIFIED BY CONTENT ID ON BASIS OF CONTENT ID, AND GENERATES FEE INFORMATION ETC. AS REQUIRED. |
| 165 | CONTENT ATTRIBUTE | INFORMATION THAT INDICATES BIT CAPACITY REQUIRED TO PROVIDE SERVICE, GROUP ABLE TO RECEIVE SERVICE, AUTHENTICATION METHOD REQUIRED TO RECEIVE SERVICE, ETC. WIRELESS COMMUNICATION APPARATUS THAT RECEIVES DISCOVERY INFORMATION MAY DECIDE, ON BASIS OF CONTENT ATTRIBUTE, WHETHER OR NOT TO RECEIVE CORRESPONDING SERVICE, OR WHETHER OR NOT CORRESPONDING SERVICE IS RECEIVABLE. |
| 166 | RANKING INFORMATION | INFORMATION THAT INDICATES WHETHER FREQUENCY OF ACCESS TO SERVICE (CONTENT) IS HIGH OR LOW. WIRELESS COMMUNICATION APPARATUS THAT TRANSMITS DISCOVERY INFORMATION MAY DECIDE, ON BASIS OF RANKING INFORMATION, WHETHER OR NOT TO ANNOUNCE DISCOVERY INFORMATION TO NEXT WIRELESS COMMUNICATION APPARATUS, OR HOW FREQUENTLY TO ANNOUNCE DISCOVERY INFORMATION. WIRELESS COMMUNICATION APPARATUS THAT RECEIVES DISCOVERY INFORMATION MAY DECIDE, ON BASIS OF RANKING INFORMATION, WHETHER OR NOT TO CACHE RECEIVED CONTENT. |
| 167 | CACHE RECOMMENDATION | INFORMATION THAT INDICATES RECOMMENDATION OF HOW MUCH SERVICE SHOULD BE CACHED FOR NEIGHBORING WIRELESS COMMUNICATION APPARATUSES (RECOMMENDED DEGREE). WIRELESS COMMUNICATION APPARATUS THAT TRANSMITS DISCOVERY INFORMATION CONFIGURES SETTING THAT RAISES RECOMMENDED DEGREE IN CASE OF JUDGING THAT SERVICE IS ACCESSED FREQUENTLY AND SERVICE SHOULD BE PROVIDED TO OTHER WIRELESS COMMUNICATION APPARATUSES. ALSO, WIRELESS COMMUNICATION APPARATUS THAT RECEIVES DISCOVERY INFORMATION MAY DECIDE, ON BASIS OF CACHE RECOMMENDATION, WHETHER OR NOT TO RECEIVE AND CACHE CONTENT. |
| 168 | CLONE DEGREE | INFORMATION THAT INDICATES HOW MANY TIMES SERVICE (CONTENT) HAS BEEN COPIED FROM ORIGINAL, OR ALTERNATIVELY, HOW MANY MORE TIMES COPYING IS ALLOWED. WIRELESS COMMUNICATION APPARATUS THAT RECEIVES DISCOVERY INFORMATION IS CONTROLLED TO BE UNABLE TO STORE COPY EQUAL TO OR GREATER THAN COUNT DETERMINED BY CLONE DEGREE. |
| 169 | REDISTRIBUTION INFORMATION | INFORMATION THAT INDICATES WHETHER OR NOT WIRELESS COMMUNICATION APPARATUS THAT RECEIVES DISCOVERY INFORMATION MAY CACHE AND REDISTRIBUTE SERVICE (CONTENT). IN WIRELESS COMMUNICATION APPARATUS THAT RECEIVES DISCOVERY INFORMATION, NEED TO CACHE AND REDISTRIBUTE SERVICE (CONTENT) IS CONTROLLED ON BASIS OF REDISTRIBUTION INFORMATION. |

DISCOVERY INFORMATION WAS RECEIVED. THE USER OF THE WIRELESS COMMUNICATION APPARATUS THAT TRANSMITTED THIS DISCOVERY INFORMATION IS NOT REGISTERED IN THE FRIEND LIST. TO REGISTER THIS USER IN THE FRIEND LIST, PERFORM THE REGISTRATION OPERATION.

| 351 REGISTRATION SELECTION | | 352 SERVICE | 353 USER ID | 354 RELATED INFORMATION |
|---|---|---|---|---|
| REGISTER | DO NOT REGISTER | | | |
|  |  | IMAGE SERVICE (REAL-TIME IMAGE FROM CAMERA) | ABC@yik.com @bububu7 | 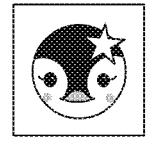 |
|  |  | MUSIC SERVICE (MUSIC CONTENT) | 87653 @kiuyt44 | 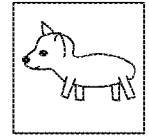 |
|  |  | MUSIC SERVICE (MUSIC CONTENT) | JHYT@okiu.jp |  |

355 ▽

356 [ OK ]   357 [ BACK ]

FIG. 15

FRIEND LIST MANAGEMENT DATABASE
411

| TERMINAL ID | ID CLASS | USER ID |
|---|---|---|
| 1234 | 0x0001 | AAA@ccc. org |
| | | BBB@ddd. jp |
| | | CCC@fff. com |
| | | ⋮ |
| | 0x001e | ⋮ |
| | 0x003f | ⋮ |
| ⋮ | ⋮ | ⋮ |

415 416 417

WIRELESS COMMUNICATION APPARATUS, COMMUNICATION SYSTEM AND WIRELESS COMMUNICATION APPARATUS CONTROL METHOD TO EXCHANGE SERVICES

CROSS-REFERENCE TO RELATED APPLICATION

The present application is a continuation application of U.S. patent application Ser. No. 15/805,187, filed Nov. 7, 2017, which claims priority from U.S. patent application Ser. No. 14/761,103, filed Jul. 15, 2015, now U.S. Pat. No. 9,826,394, which is a National Stage of PCT/JP2013/079966, filed Nov. 6, 2013, and claims the benefit of priority from prior Japanese Patent Application JP 2013-013561, filed Jan. 28, 2013, the entire content of which is hereby incorporated by reference.

TECHNICAL FIELD

The present technology relates to a wireless communication apparatus, and more particularly relates to a wireless communication apparatus that transmits and receives data with another wireless communication apparatus using wireless communication, a communication system, a wireless communication apparatus control method, and a program causing a computer to execute the method.

BACKGROUND ART

In the related art, there exists wireless communication technology in which various data is exchanged using wireless communication. For example, a communication method in which nearby wireless communication apparatuses autonomously interconnect (by ad hoc communication or in an ad hoc network, for example) has been proposed (see Patent Literature 1, for example).

CITATION LIST

Patent Literature

Patent Literature 1:
  JP 2009-239385A

SUMMARY OF INVENTION

Technical Problem

According to the above technology of the related art, two wireless communication apparatuses are able to exchange various data with each other using wireless communication, without connecting using a wired link. In addition, on such a network, each wireless communication apparatus is able to communicate with nearby wireless communication apparatuses without depending on a master station such as a control apparatus.

In this way, it is possible to freely communicate with surrounding wireless communication apparatuses by using wireless communication. However, suppose that among the multiple wireless communication apparatuses present nearby, there exists a wireless communication apparatus used by a known user, and a wireless communication apparatus used by a user who is completely unknown. In such cases, in order to improve safety, it is conceivably more preferable to receive a service provided by the wireless communication apparatus used by the known user.

The present technology has been devised in light of such circumstances, and an objective thereof is to easily and safely exchange services using wireless communication among wireless communication apparatuses.

Solution to Problem

The present technology has been made in order to solve the above problems, and a first aspect thereof is a wireless communication apparatus, a control method thereof, and a program causing a computer to execute the method, the wireless communication apparatus including: a communication unit configured to use wireless communication to transmit and receive data related to a service provided by at least one of the wireless communication apparatus and another wireless communication apparatus with other wireless communication apparatuses present within a designated range; and a control unit configured to associate service information for identifying the service with user information for identifying a user using a wireless communication apparatus that provides the service, and include and transmit the associated information in the data. Accordingly, such a configuration acts to associate service information for identifying a service with user information for identifying a user using a wireless communication apparatus that provides the service, include the associated information in data, and transmit the data.

In the first aspect, when the data is received, the control unit may judge, on the basis of the user information included in the data, whether or not to receive a service according to the service information associated with the user information from another wireless communication apparatus according to the user information. Accordingly, such a configuration acts to judge, on the basis of user information included in received data, whether or not to receive a service according to the service information associated with the user information from another wireless communication apparatus according to the user information.

In the first aspect, the control unit may judge whether or not to receive the service, on the basis of whether or not the user information included in the received data matches the user information registered in an allow list. Accordingly, such a configuration acts to judge whether or not to receive a service, on the basis of whether or not user information included in received data matches user information registered in an allow list.

In the first aspect, the control unit may judge whether or not to receive the service, on the basis of a result of a match determination using the allow list stored in a storage unit or the allow list stored in an external apparatus. Accordingly, such a configuration acts to judge whether or not to receive a service, on the basis of a result of a match determination using an allow list stored in a storage unit or an allow list stored in an external apparatus.

In the first aspect, the control unit may judge whether or not to receive the service, on the basis of whether or not the user information included in the received data matches the user information registered in a blocked list. Accordingly, such a configuration acts to judge whether or not to receive a service, on the basis of whether or not user information included in received data matches user information registered in a blocked list.

In the first aspect, the control unit may include, in the data, and transmit first user information which is the user information according to a user using the wireless communication apparatus, and second user information which is the user information included in the data transmitted from another wireless communication apparatus, and also the user information according to a user using the other wireless communication apparatus. Accordingly, such a configuration acts to include first user information and second user information in data and transmit the data.

In the first aspect, the control unit may include only the second user information for which forwarding is allowed in the data and transmits the data. Accordingly, such a configuration acts to include only second user information for which forwarding is allowed in data and transmit the data.

A second aspect of the present technology is a wireless communication apparatus, a control method thereof, and a program causing a computer to execute the method, the wireless communication apparatus including: a communication unit configured to transmit and receive data related to a service provided by at least one of the wireless communication apparatus and another wireless communication apparatus, the data including information associating service information for identifying the service with user information for identifying a user using a wireless communication apparatus that provides the service; and a control unit that, when the data is received, judges, on the basis of the user information included in the data, whether or not to receive a service according to the service information associated with the user information from another wireless communication apparatus according to the user information. Accordingly, when data is received, such a configuration acts to judge, on the basis of user information included in the data, whether or not to receive a service according to the service information associated with the user information from another wireless communication apparatus according to the user information.

A third aspect of the present technology is a communication system, a control method thereof, and a program causing a computer to execute the method, the communication system including: a first wireless communication apparatus provided with a communication unit configured to use wireless communication to transmit and receive data related to a service provided by at least one of the wireless communication apparatus and another wireless communication apparatus with other wireless communication apparatuses present within a designated range, and a control unit configured to associate service information for identifying the service with user information for identifying a user using a wireless communication apparatus that provides the service, and include and transmit the associated information in the data; and a second wireless communication apparatus provided with a communication unit that transmits and receives the data, and a control unit that, when the data is received, judges, on the basis of the user information included in the data, whether or not to receive a service according to the service information associated with the user information from another wireless communication apparatus according to the user information. Accordingly, an effect is realized in which a first wireless communication apparatus associates service information for identifying a service with user information for identifying a user using a wireless communication apparatus that provides the service, includes and transmits the associated information in data, while a second wireless communication apparatus judges, on the basis of the user information included in the data, whether or not to receive the service according to the service information associated with the user information from another wireless communication apparatus according to the user information.

Advantageous Effects of Invention

According to the present technology, the advantageous effect of being able to easily and safely exchange services using wireless communication among wireless communication apparatuses may be achieved.

BRIEF DESCRIPTION OF DRAWINGS

FIG. 8 is a diagram illustrating an example format of a beacon transmitted by each wireless communication apparatus constituting a communication system 100 according to the first embodiment of the present technology.

FIG. 9 is a diagram illustrating an example of a display screen (registration screen 350) displayed on a display unit 280 according to the first embodiment of the present technology.

FIG. 15 is a diagram that schematically illustrates an example of managed content in a friend list management database 411 stored in memory 300 according to a modification of the first embodiment of the present technology.

DESCRIPTION OF EMBODIMENTS

Hereinafter, embodiments for carrying out the present technology (hereinafter designated embodiments) will be described. The description will proceed in the following order.
1. First embodiment (communication control: example of judging whether or not to receive service on the basis of user information included in discovery information)
2. Second embodiment (communication control: example of including user information of local apparatus and other apparatus in discovery information to transmit data)

1. First Embodiment

[Exemplary Configuration of Communication System]

Figure 1:
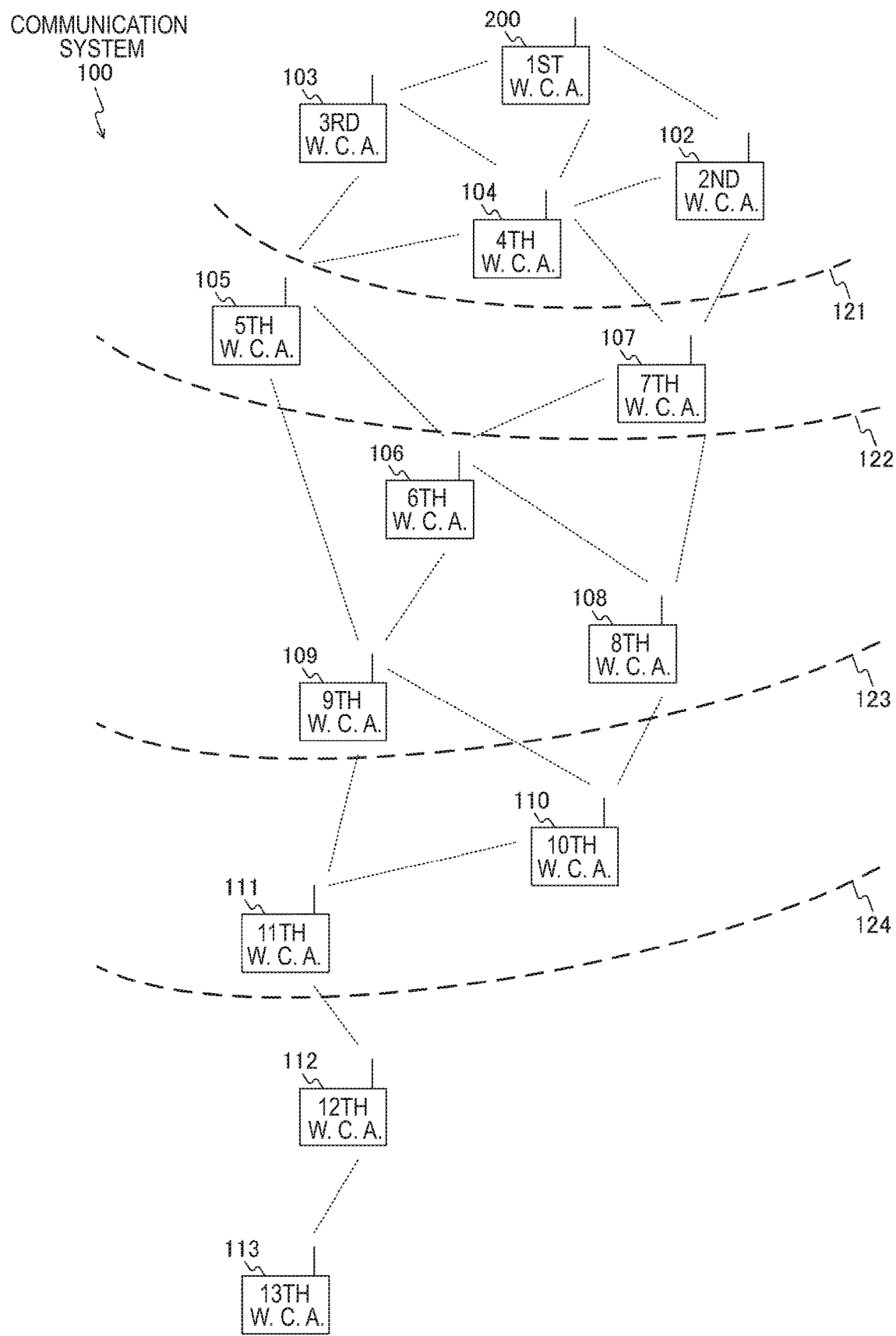
FIG. 1 is a diagram that illustrates an exemplary system configuration of a communication system 100 according to a first embodiment of the present technology.

FIG. 1 is a diagram that illustrates an exemplary system configuration of a communication system 100 according to a first embodiment of the present technology. Note that in some of the drawings, wireless communication apparatuses are each abbreviated as "W. C. A." for convenience.

The communication system 100 is equipped with a plurality of wireless communication apparatuses (first wireless communication apparatus 200, second wireless communication apparatus 102, third wireless communication apparatus 103, and so on to a 13th wireless communication apparatus 113). Each wireless communication apparatus (device) constituting the communication system 100 is, for example, a portable information processing apparatus (such as a smartphone, mobile phone, or tablet, for example), or a stationary information processing apparatus (such as a printer or personal computer, for example).

Herein, ad hoc communication, ad hoc networks, and the like are known as communication methods in which nearby wireless communication apparatuses autonomously interconnect. On such a network, each wireless communication apparatus is able to communicate with nearby wireless communication apparatuses without depending on a master station (for example, a control apparatus). Accordingly, an embodiment of the present technology will be described by taking an ad hoc network as an example of a communication method in which nearby wireless communication apparatuses autonomously interconnect.

On an ad hoc network, if a new wireless communication apparatus is added nearby, the new wireless communication apparatus is also able to freely join the network. For example, suppose a case in which, at first, only the first wireless communication apparatus 200, the second wireless communication apparatus 102, the third wireless communication apparatus 103, and so on to the eighth wireless communication apparatus 108 have joined the ad hoc network from among the wireless communication apparatuses illustrated in FIG. 1. In this case, suppose that the ninth wireless communication apparatus 109 to the 13th wireless communication apparatus 113 are successively added. In this case, the network coverage may be increased as these wireless communication apparatuses (nearby wireless communication apparatuses) increase. In other words, the network coverage may be increased as the ninth wireless communication apparatus 109 to the 13th wireless communication apparatus 113 are successively added.

Herein, besides autonomously interconnecting with nearby wireless communication apparatuses, each wireless communication apparatus is also able to forward information to be exchanged with another wireless communication apparatus in a bucket relay manner.

For example, suppose that the first wireless communication apparatus 200 is able to communicate directly with each of the second wireless communication apparatus 102 to the fourth wireless communication apparatus 104, but is unable to communicate directly with the other wireless communication apparatuses because of factors such as limited radio range. In FIG. 1, the range over which the first wireless communication apparatus 200 may communicate directly (the transmission range based on the first wireless communication apparatus 200) is indicated as a transmission range 121. Note that the transmission range 121 corresponds to the transmission range in the case of limiting the forwarding (hop) count to one time.

Even when direct communication is unavailable in this way, a wireless communication apparatus capable of communicating directly with the first wireless communication apparatus 200 (the second wireless communication apparatus 102 to the fourth wireless communication apparatus 104) is able to forward data from the first wireless communication apparatus 200 to another wireless communication apparatus. Accordingly, by forwarding data in this way, it becomes possible for the first wireless communication apparatus 200 and a wireless communication apparatus that is unable to communicate directly with the first wireless communication apparatus 200 to exchange information with each other. For example, it becomes possible for the first wireless communication apparatus 200 and the fifth wireless communication apparatus 105 that is unable to communicate directly with the first wireless communication apparatus 200 to exchange information with each other via the third wireless communication apparatus 103 (or the fourth wireless communication apparatus 104).

A method that conducts mutual data forwarding (also called a bucket relay) in this way and delivers information to distance wireless communication apparatuses is designated a multi-hop relay. Also, a network that conducts multi-hop is typically known as a mesh network.

Figure 2:
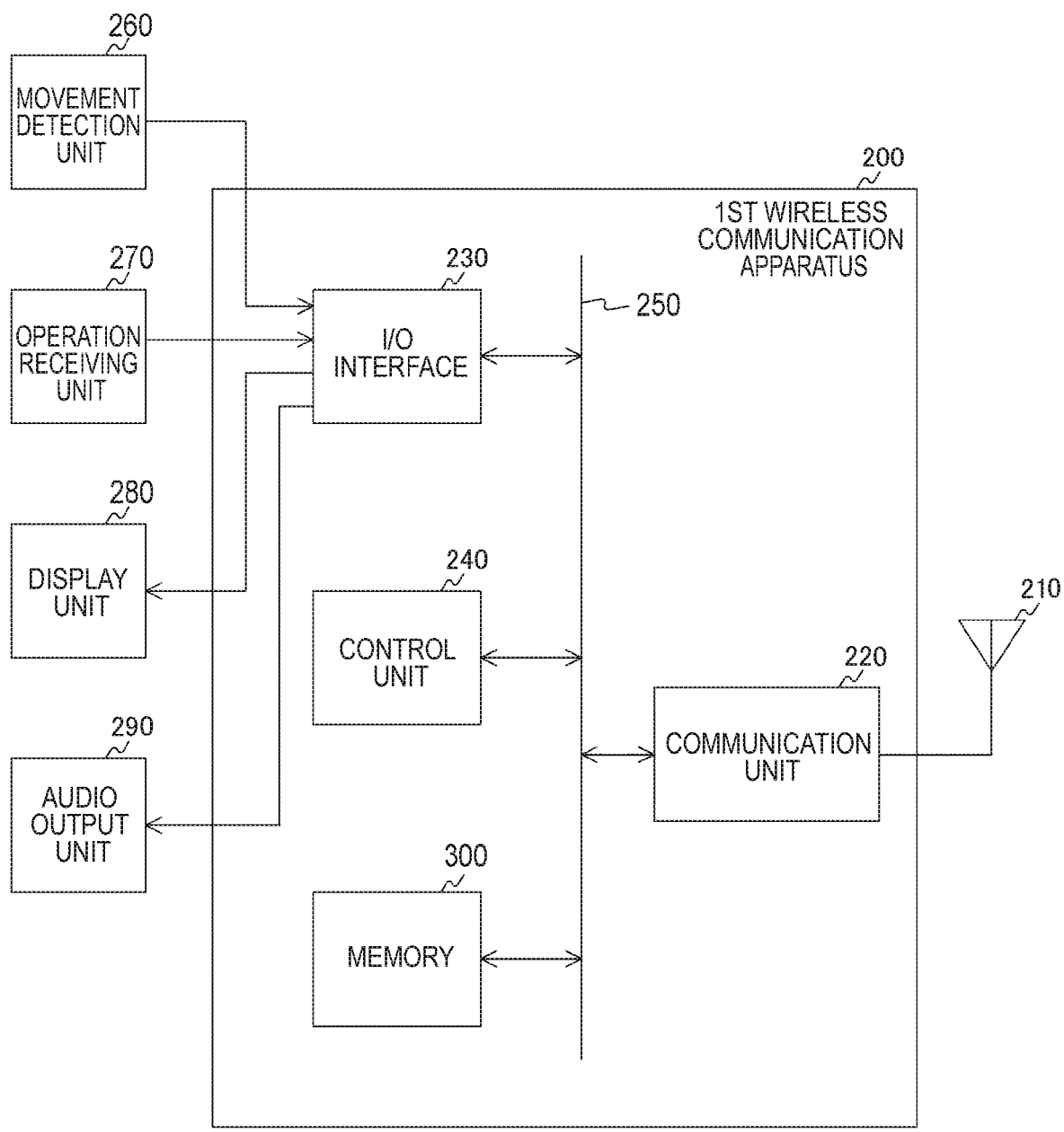
FIG. 2 is a block diagram illustrating an exemplary internal configuration of a first wireless communication apparatus 200 according to the first embodiment of the present technology.

FIG. 2 illustrates a configuration of a wireless communication apparatus constituting such an ad hoc network or mesh network.

A multi-hop relay used in an embodiment of the present technology will now be described.

As an example, a procedure will be described in which a mesh network is formed as illustrated in FIG. 1, and the first wireless communication apparatus 200 communicates with the fifth wireless communication apparatus 105.

The first wireless communication apparatus 200, before starting communication with the fifth wireless communication apparatus 105, specifies which communication route to use (which wireless communication apparatus to traverse). For example, the first wireless communication apparatus 200 exchanges communication routing information with each neighboring wireless communication apparatus, on the basis of a procedure conforming to an established communication routing protocol.

For example, a procedure determined by the standard of the Optimized Link State Routing Protocol (OLSR) of RFC 3626 published by the IETF may be used. As another example, a procedure determined by a standard such as the IEEE Standard for Information Technology—Telecommunications and information exchange between systems—Local and metropolitan area networks—Specific requirements, Part 11: Wireless LAN Medium Access Control (MAC) and Physical Layer (PHY) specifications, Amendment 10: Mesh Networking (commonly known as IEEE 802.11s) published by the IEEE may be used.

On the basis of these procedures, the first wireless communication apparatus 200 is able to detect that communication with the fifth wireless communication apparatus 105 is possible by traversing the third wireless communication apparatus 103, without needlessly wasting radio resources. For example, it is possible to detect that communication is possible without needless waste, on the basis of factors such as a small number of relay nodes, minimal transmission delay, and minimal time occupying a frequency channel for transmission.

The information used for the detection is held internally in each wireless communication apparatus as communication route information, and when a packet is actually transmitted or received, the information is referenced to search for which wireless communication apparatus the packet should be transmitted to next in order to make the packet reach the final destination.

In the procedure discussed above, the first wireless communication apparatus 200 acquires communication route information that is valid up to the fifth wireless communication apparatus 105. Subsequently, on the basis of the acquired communication route information, the first wireless communication apparatus 200 transmits a packet addressed to the fifth wireless communication apparatus 105 to the third wireless communication apparatus 103. The third wireless communication apparatus 103 receives the packet, and on the basis of internally held communication route information, forwards the received packet addressed to the fifth wireless communication apparatus 105 to the fifth wireless communication apparatus 105.

Note that the creation of the above communication route information is also conducted with respect to all wireless communication apparatuses connected to the mesh network in some cases. However, in some cases, such as when there is an extremely large number of wireless communication apparatuses present on the network, the overhead related to the creation of communication route information increases due to factors such as control packets. Accordingly, to reduce the overhead related to the creation of communication route information due to factors such as control packets, a limit on the number of times that each packet is forwarded may be imposed as discussed earlier, for example.

At this point, suppose that in the example illustrated in FIG. 9, a music service is received from the fifth wireless communication apparatus 105 via the third wireless communication apparatus 103, as indicated by the arrow 131. In addition, suppose that an image service is received from the seventh wireless communication apparatus 107 via the fourth wireless communication apparatus 104, as indicated by the arrow 132.

In addition, a setup that uses an ad hoc network or mesh network to circulate content while freely communicating with nearby apparatus is conceivable. In order to realize such a setup, it is necessary to announce to nearby apparatus which wireless communication apparatus is holding which content and is able to supply content.

Figure 7A:
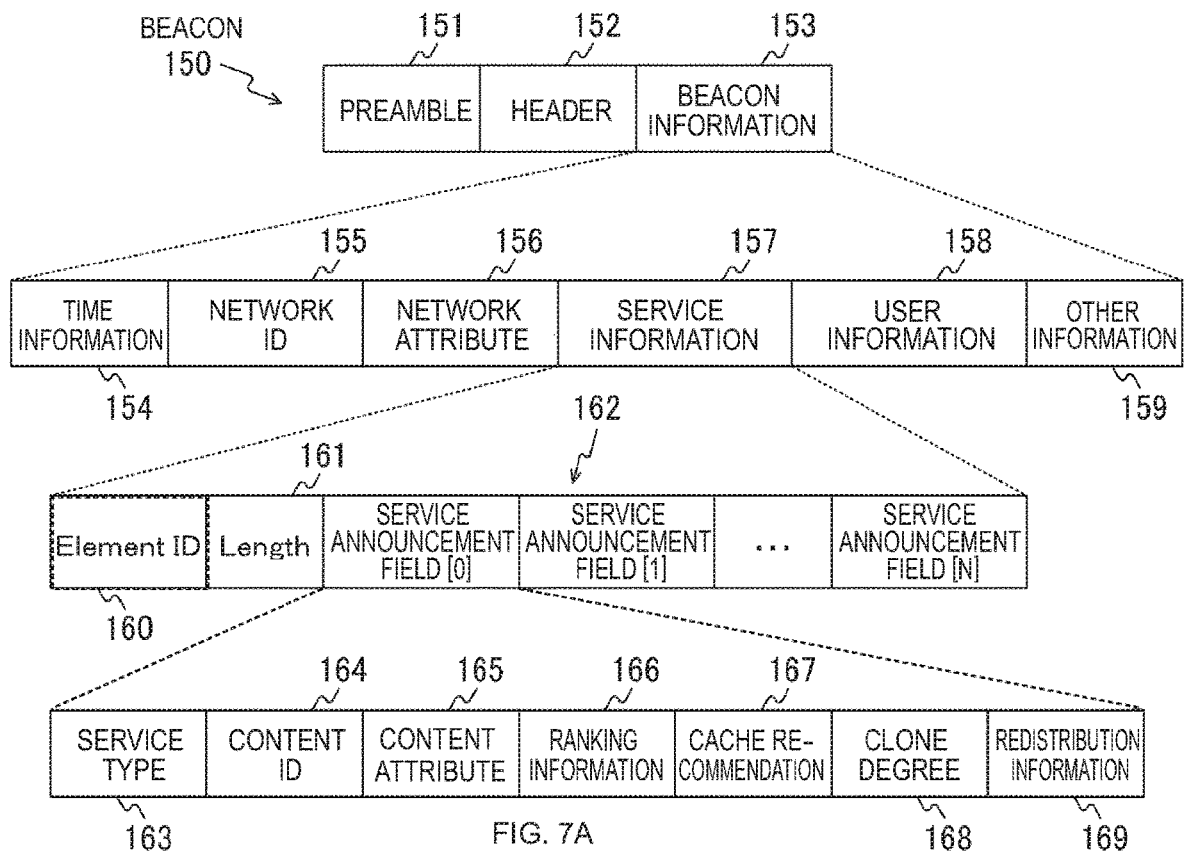
FIGS. 7A and 7B are diagrams illustrating an example format of a beacon transmitted by each wireless communication apparatus constituting a communication system 100 according to the first embodiment of the present technology.
Figure 7B:
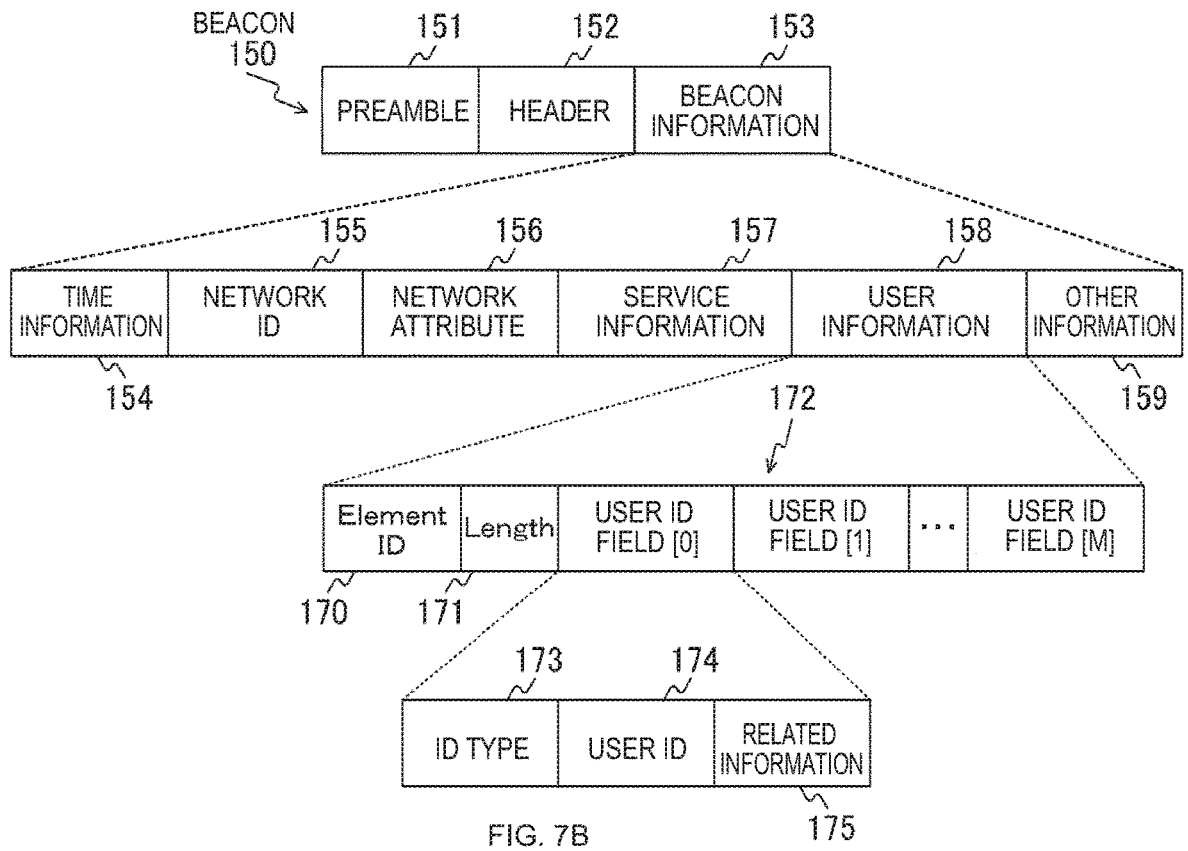

For example, as illustrated in FIGS. 7A and 7B, by including discovery information (service information 157) in a beacon periodically transmitted by each wireless communication apparatus, it is possible to announce to nearby equipment the services providable by each wireless communication apparatus. In addition, by searching for beacons, each wireless communication apparatus is able to discover wireless communication apparatuses present nearby. In this case, it is also possible to detect what kinds of services are provided by the discovered wireless communication apparatus.

At this point, suppose that among the multiple wireless communication apparatuses present nearby, there exists a wireless communication apparatus used by a known user, and a wireless communication apparatus used by a user who is completely unknown. For this reason, when receiving a service, for example, it is possible to receive the service from the wireless communication apparatus being used by the known user, and it is also possible to receive the service from the wireless communication apparatus being used by the completely unknown user. In such cases, in order to improve safety, it is conceivably more preferable to receive a service provided by the wireless communication apparatus used by the known user. Accordingly, in an embodiment of the present technology, user information (the user information 158 illustrated in FIGS. 7A and 7B) is included in the discovery information and transmitted, and it is judged whether or not to receive a service on the basis of the user information.

Herein, discovery information is information that is used when discovering a service that another wireless communication apparatus is able to provide (information for reporting the services provided by each wireless communication apparatus). For example, the service information 157 and the user information 158 illustrated in FIGS. 7A and 7B correspond to discovery information. Note that service information and user information will be described in detail with reference to FIGS. 7A and 7B. In addition, discovery information may also be understood as service discovery information.

[Exemplary Configuration of Wireless Communication Apparatus]

FIG. 2 is a block diagram illustrating an exemplary internal configuration of a first wireless communication apparatus 200 according to the first embodiment of the present technology. Note that since the internal configuration of other wireless communication apparatuses is the same as the first wireless communication apparatus 200, herein, only the first wireless communication apparatus 200 will be described, and description of the other wireless communication apparatuses will be omitted.

The first wireless communication apparatus 200 is equipped with antenna 210, a communication unit 220, an input/output (I/O) interface 230, a control unit 240, and memory 300. In addition, these components are connected via a bus 250.

The communication unit 220 is a module for transmitting and receiving radio waves via the antenna 210 (a modem, for example). For example, the communication unit 220 is able to conduct wireless communication via millimeter wave communication (such as 60 GHz), 5 GHz wireless local area network (LAN), or ultra wideband (UWB). As another example, the communication unit 220 is able to conduct wireless communication via visible light communication or near field communication (NFC).

For example, the communication unit 220, on the basis of control by the control unit 240, uses wireless communication to transmit and receive discovery information (the service information 157 and the user information 158 illustrated in FIGS. 7A and 7B) with other wireless communication apparatuses present within a predetermined range. In addition, the communication unit 220, on the basis of control by the control unit 240, uses wireless communication to transmit and receive data related to services provided by each wireless communication apparatus with other wireless communication apparatuses present within a predetermined range. In this case, the communication unit 220 is also able to forward data related to services provided by one wireless communication apparatus to another wireless communication apparatus. In other words, the communication unit 220 is able to use wireless communication to transmit and receive data related to a service provided by at least one of the first wireless communication apparatus 200 and another wireless communication apparatus to other wireless communication apparatuses present within a predetermined range. Herein, suppose that the predetermined range is a range based on the position of the first wireless communication apparatus 200, for example, and means a range in which the communication unit 220 is able to transmit and receive data using wireless communication. In addition, suppose that another wireless communication apparatus present within the predetermined range is a wireless communication apparatus adjacent to the first wireless communication apparatus 200, for example, and is a wireless communication apparatus that is able to transmit and receive data with the first wireless communication apparatus 200 using wireless communication.

Note that the communication unit 220 may be configured to conduct wireless communication using radio waves (electromagnetic waves), and may also be configured to conduct wireless communication using a medium other than radio waves (for example, wireless communication conducted using a magnetic field).

In addition, the communication unit 220 establishes a communication link and conducts bidirectional communication with adjacent wireless communication apparatuses, and in addition, manages the number of adjacent wireless communication apparatuses able to communicate with the first wireless communication apparatus 200, and stores information indicating the number of adjacent wireless communication apparatuses that are able to communicate (communicable count information). In addition, the communication unit 220 periodically or non-periodically observes the occupancy of the channel used for wireless communication, and stores information indicating the degree to which the communication links around the first wireless communication apparatus 200 are congested (congestion information). In addition, the communication unit 220 observes the link quality (such as the received signal power and transmittable data rate) with adjacent wireless communication apparatuses conducting wireless communication, and stores information indicating how much bandwidth is available for wireless communication with an adjacent wireless communication apparatus (communication status information). Subsequently, the communication unit 220 supplies the respective information to the control unit 240.

[Exemplary Configuration of Wireless Communication Apparatus]

The I/O interface 230 is an interface with external apparatus such as sensors and actuators that operate in conjunction with the first wireless communication apparatus 200. FIG. 2 illustrates an example in which a movement detection unit 260, an operation receiving unit 270, a display unit 280, and an audio output unit 290, for example, are connected to the I/O interface 230 as external apparatus. Also, although FIG. 2 illustrates an example of providing the movement detection unit 260, the operation receiving unit 270, the display unit 280, and the audio output unit 290 externally to the first wireless communication apparatus 200, some or all of these may also be built into the first wireless communication apparatus 200.

The movement detection unit 260 detects movement of the first wireless communication apparatus 200 by detecting properties such as the acceleration, motion, and orientation of the first wireless communication apparatus 200, and outputs movement information related to the detected movement to the control unit 240 via the I/O interface 230. For example, the movement detection unit 260 stores, and supplies to the control unit 240, movement information indicating whether or not the first wireless communication apparatus 200 has moved location (a log (or real-time information related to the movement)). For the movement detection unit 260, an acceleration sensor, a gyro sensor, and a Global Positioning System (GPS) receiver may be used, for example. For example, the movement detection unit 260 may use position information detected using GPS (for example, latitude and longitude) to compute the movement distance of the first wireless communication apparatus 200 (for example, the movement distance per unit time).

The operation receiving unit 270 is an operation receiving unit that receives operating input performed by a user, and outputs operating information corresponding to received operating input to the control unit 240 via the I/O interface 230. The operation receiving unit 270 is realized with a touch panel, keyboard, or mouse, for example.

The display unit 280 is a display unit that displays various information (for example, the registration screen 350 illustrated in FIG. 9) on the basis of control by the control unit 240. Note that for the display unit 280, a display panel such as an organic electroluminescence (EL) panel or a liquid crystal display (LCD) panel may be used, for example. Note that the operation receiving unit 270 and the display unit 280 may also be integrated by using a touch panel that enables a user to perform operating input by bringing a finger in contact with or in proximity to a display screen.

The audio output unit 290 is an audio output unit (for example, a speaker) that outputs various audio on the basis of control by the control unit 240.

The controller 240 controls the operation of each component of first wireless communication apparatus 200 on the basis of a control program stored in the memory 300. For example, the control unit 240 conducts signal processing on transmitted and received information. Also, the control unit 240 is realized by a central processing unit (CPU).

The memory 300 is memory that stores various information. For example, various information (for example, a control program) required for the first wireless communication apparatus 200 to conduct desired operation is stored in the memory 300. In addition, various content such as music content and image content (for example, moving image content and still image content) are stored in a content storage area of the memory 300.

In addition, a user information management table 310 for managing user information (illustrated in FIG. 3) and a friend list management table 320 for managing a friend list (illustrated in FIG. 4) are stored in the memory 300. In addition, a blocked list management table 330 for managing a blocked list (illustrated in FIG. 5) is stored in the memory 300.

For example, when transmitting data using wireless communication, the control unit 240 processes information read out from the memory 300, a signal input from the I/O interface 230, or the like, and generates a chunk of data (transmission packet) to actually transmit. Subsequently, the control unit 240 outputs the generated transmission packet to a communication unit 220. Also, the communication unit 220, after converting the transmission packet into the format of a communication scheme for actual transmission and the like, externally transmits the converted transmission packet from an antenna 210.

As another example, when receiving data using wireless communication, the communication unit 220 extracts a received packet by having a receiver built into the communication unit 220 perform signal processing on a radio signal received via an antenna 210. Subsequently, the control unit 240 interprets the extracted and received packet. If, as a result of the interpretation, the extracted and received packet is judged to be data that should be stored, the control unit 240 writes the data to the memory 300. Further, if the extracted and received packet is judged to be data that should be forwarded to another wireless communication apparatus, the control unit 240 outputs the data to the communication unit 220 as a transmission packet to be forwarded to another wireless communication apparatus. Also, if the extracted and received packet is judged to be data that should be forwarded to an external actuator, the control unit 240 externally outputs the data from the I/O interface 230 (for example, to the display unit 280).

For example, the control unit 240 may provide various content stored in the memory 300 to another wireless communication apparatus using wireless communication. Also, the control unit 240 generates user information (the user information 158 illustrated in FIGS. 7A and 7B) on the basis of the user information management table 310 in the memory 300, and transmits discovery information including the generated user information to another wireless communication apparatus.

Note that when the first wireless communication apparatus 200 is driven by a battery, a battery is installed onboard the first wireless communication apparatus 200 (either built-in or inserted). In this case, the control unit 240 is equipped with a function of estimating the remaining battery level, and is able to acquire the estimated remaining battery level on demand.

[Example Content of User Information Management Table]

Figure 3:
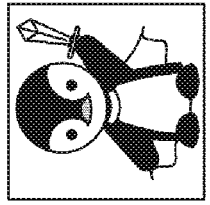
FIG. 3 is a diagram that schematically illustrates an example of managed content in a user information management table 310 stored in memory 300 according to the first embodiment of the present technology.

FIG. 3 is a diagram that schematically illustrates an example of managed content in a user information management table 310 stored in memory 300 according to the first embodiment of the present technology.

The user information management table 310 is a table for managing information related to users who use the first wireless communication apparatus 200 (user information). Herein, it is anticipated that the first wireless communication apparatus 200 may also be used by multiple users (a family, for example). For this reason, FIG. 3 illustrates an example of the user information management table 310 managing user information related to multiple users.

Herein, user information is information for identifying a user who uses the first wireless communication apparatus 200. In addition, user information may also be understood as owner information. In addition, user information has a one-to-one correspondence with service information (the service information 157 illustrated in FIGS. 7A and 7B).

Specifically, in the user information management table 310, management information 311, a name 312, an identifier (ID) class 313, a user ID 314, and related information 315 are stored in association with each other. Note that FIG. 3 illustrates an example registration in which user information related to four family members (father, mother, daughter, son) is registered.

The management information 311 is information for managing, in units of users, user information to be registered.

The name 312 stores a name for identifying a user (for example, a personal name or a nickname). For example, the name 312 stores a name from an input operation by a user.

The ID class 313 stores an identifier indicating the class of the user ID. Also, the ID class is a unique ID across the entire system. In FIG. 3, for example, the ID class of an email address is expressed as "0x0001", the ID class of an account for a short message information service is expressed as "0x001e", and the ID class specific to a location is expressed as "0x003f". Note that the ID class specific to a location is, for example, an ID used at the location where the user is present, and may be an employee ID number or a student ID number, for example.

The user ID 314 stores, for each ID class 313, an ID for identifying the user (identification information (for example, information made up of letters, numbers, and symbols)). For example, "xxx@foo.org" (email address) is stored as the user ID 314 corresponding to the ID class 313 "0x0001".

The related information 315 stores various information related to the user. For example, information for identifying the user (for example, an image or code for identifying the user) is stored. For example, a person may be identified by causing the information stored in the related information 315 to be displayed on another wireless communication apparatus.

A method of registering user information in the user information management table 310 will now be described. For example, registration in the user information management table 310 may be conducted according to input operations by the user. For example, when a user inputs some kind of ID into an application running on the first wireless communication apparatus 200, the input ID may be acquired and registered as a user ID. This registration example will be described in detail with reference to FIG. 12. In addition, it is also possible to write user information to the user information management table 310 during the process of manufacturing the first wireless communication apparatus 200. In this case, the first wireless communication apparatus 200 is shipped in a state in which user information is registered in the user information management table 310.

In addition, when the first wireless communication apparatus 200 is shared among multiple people, an ID for identifying a user or a user group may also be conceivably registered as a user ID. For example, on a tablet used by a family, it is possible for an ID for identifying the family to be registered as a user ID. The user ID in this case functions as an ID for identifying all users constituting the family (for example, father, mother, daughter, son).

Note that although FIG. 3 illustrates an example of collectively managing multiple users with the user information management table 310, a user information management table may also be prepared for each user, and each user may be managed separately.

In addition, it is also possible to modify user information stored in the user information management table 310 according to externally given information.

[Example Content of Friend List Management Table]

Figure 4:
FIG. 4 is a diagram that schematically illustrates an example of managed content in a friend list management table 320 stored in memory 300 according to the first embodiment of the present technology.

FIG. 4 is a diagram that schematically illustrates an example of managed content in a friend list management table 320 stored in memory 300 according to the first embodiment of the present technology.

The friend list management table 320 is a table for managing a list (friend list) of peers (for example, friends and acquaintances of the user) permitted to use the first wireless communication apparatus 200 to receive various services. Herein, the friend list is a list used when judging whether or not user information transmitted from an adjacent wireless communication apparatus has a relationship with a user (or owner) who uses the first wireless communication apparatus 200. In other words, the friend list may be understood as an allow list.

Specifically, in the friend list management table 320, an ID class 321, a user ID 322, and communication history information 323 are sorted by each ID class and stored in association with each other.

The ID class 321 stores an identifier indicating the class of the user ID. Note that the ID class 321 corresponds to the ID class 313 illustrated in FIG. 3.

The user ID 322 stores, for each ID class 321, a user ID for identifying the user. Note that the user ID 322 corresponds to the user ID 314 illustrated in FIG. 3.

The communication history information 323 stores information (communication history information) related to communication conducted with a wireless communication apparatus used by a user whose user ID is stored in the user ID 322. In the communication history information 323, communication times and communication durations are successively logged, for example. Note that the communication history information 323 may also be configured to log only the most recent communication history information.

Herein, registration in the friend list management table 320 is conducted according to an input operation by the user, or a registration operation by the user using user information included in received discovery information. Note that the registration operation using user information included in discovery information will be described in detail with reference to FIG. 9.

Figure 14:
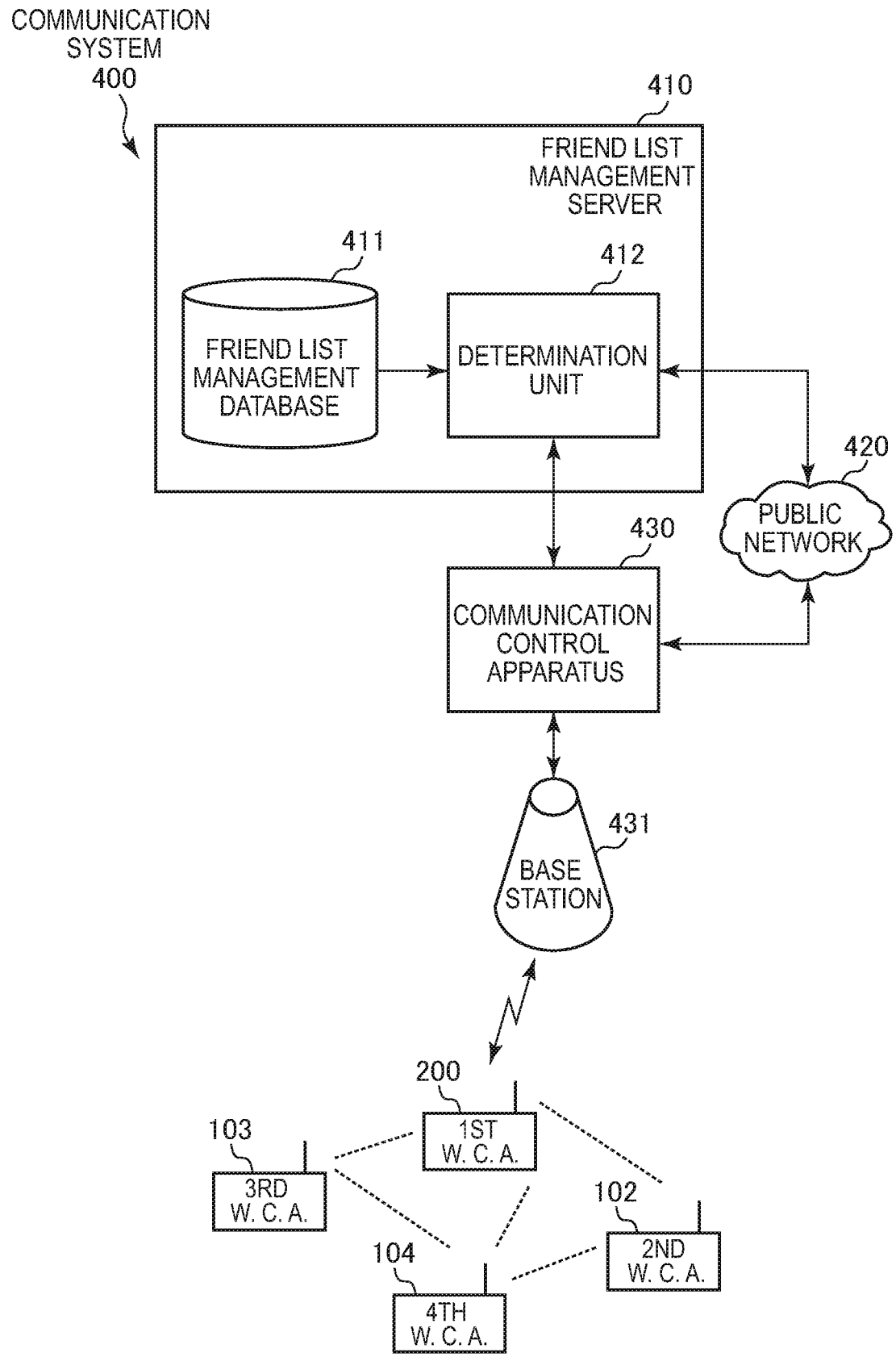
FIG. 14 is a diagram that illustrates an exemplary system configuration of a communication system 400 according to a modification of the first embodiment of the present technology.

In addition, registration in the friend list management table 320 may also be conducted according to a result of querying an external database (for example, the friend list management database 411 illustrated in FIG. 14). For example, if a user is determined to have a relationship with a user who uses the first wireless communication apparatus 200 as a result of querying an external database, the user information related to that user may be registered automatically in the friend list management table 320.

Note that the number of entries in the friend list management table 320 is also expected to become larger than necessary. In such cases, on the basis of the communication history information stored in the communication history information 323, the user IDs with the oldest last communication time may be successively removed from among the user IDs stored in the user ID 322. Consequently, the number of entries in the friend list management table 320 may be kept within a designated value.

Note that although FIG. 4 illustrates an example in which the first wireless communication apparatus 200 is provided with one friend list, a friend list may also be created and used for each of multiple users (for example, a family). In this way, when using a friend list for each of multiple users, the friend list to use for a determination process (for example, the processing in step S912 illustrated in FIG. 13) is changed according to the user who is actually using the first wireless communication apparatus 200.

In addition, a friend list management table categorized according the type of friend (such as the closeness of a friend (for example, close friends and not particularly close friends), friends from work, and friends from school, for example) may also be created and used. In this case, one friend list management table may be created for each user, or one friend list management table may be created for multiple people. In addition, multiple friend list management tables may also be created according to the type of friend. When categorizing friends in this way, for example, different processes may be conducted when permitting the receiving of various services, depending on the type of friend (for example, automatic permission, or permission only when a designated condition is satisfied).

[Example Content of Blocked List Management Table]

Figure 5:
FIG. 5 is a diagram that schematically illustrates an example of managed content in a blocked list management table 330 stored in memory 300 according to the first embodiment of the present technology.

FIG. 5 is a diagram that schematically illustrates an example of managed content in a blocked list management table 330 stored in memory 300 according to the first embodiment of the present technology.

The blocked list management table 330 is a table for managing peers (for example, persons unknown to the user) blocked from using the first wireless communication apparatus 200 to receive various services. Note that the blocked list may also be referred to as a blacklist.

Specifically, in the blocked list management table 330, an ID class 331 and a user ID 332 are stored in association with each other.

Note that the ID class 331 and the user ID 332 correspond to the ID class 321 and the user ID 322 illustrated in FIG. 4.

Herein, registration in the blocked list management table 330 is conducted according to an input operation by the user, or a registration operation by the user using user information included in received discovery information. Note that the registration operation using user information included in discovery information will be described in detail with reference to FIG. 9.

In addition, registration in the blocked list management table 330 may also be conducted according to registered content in the friend list management table 320. For example, on the basis of registered content in the friend list management table 320, if a user is determined to not have a relationship with a user who uses the first wireless communication apparatus 200, the user information related to that user may be registered automatically in the blocked list management table 330.

In addition, registration in the blocked list management table 330 may also be conducted according to a result of querying an external database (for example, the friend list management database 411 illustrated in FIG. 14). For example, if a user is determined to not have a relationship with a user who uses the first wireless communication apparatus 200 as a result of querying an external database, the user information related to that user may be registered automatically in the blocked list management table 330.

[Example Transmission of Discovery Information]

Figure 6:
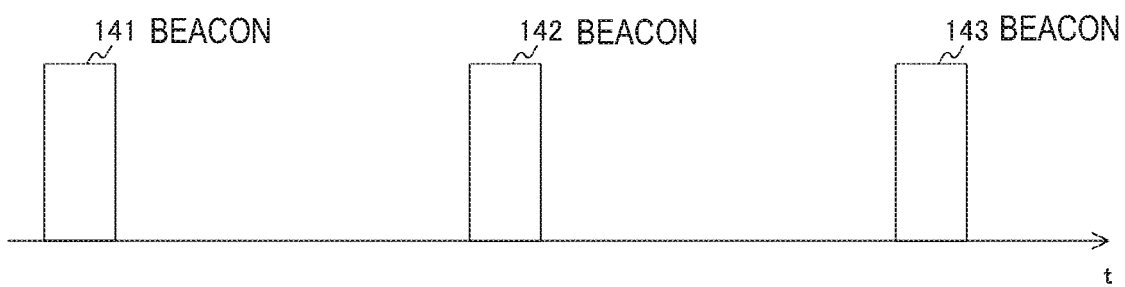
FIG. 6 is a diagram illustrating a transmission example in a case in which each wireless communication apparatus constituting a communication system 100 according to the first embodiment of the present technology transmits discovery information.

FIG. 6 is a diagram illustrating a transmission example in a case in which each wireless communication apparatus constituting a communication system 100 according to the first embodiment of the present technology transmits discovery information.

FIG. 6 illustrates an example of periodically (or non-periodically) transmitting a beacon (beacon signal) including discovery information. Also, FIG. 6 illustrates an example of beacon transmission with the horizontal axis representing the time axis. In other words, FIG. 6 diagrammatically illustrates beacons 141 to 143 successively transmitted in a time series.

Herein, discovery information is information that is used when discovering a service that another wireless communication apparatus is able to provide, and is the local apparatus service information 157 and the other apparatus service information 158 illustrated in FIGS. 7A and 7B, for example.

Note that although an embodiment of the present technology illustrates an example of including and transmitting service information and user information, in association with each other, in a beacon, the service information and the user information may also be included in different signals and transmitted.

[Example Format of Discovery Information]

FIGS. 7A, 7B, and 8 are diagrams illustrating an example format of a beacon transmitted by each wireless communication apparatus constituting a communication system 100 according to the first embodiment of the present technology. Note that FIG. 7A illustrates an example format of service information 157 included in beacon information 153, while FIG. 7B illustrates an example format of user information 158 included in beacon information 153. Also, FIG. 8 illustrates example content of a service announcement field included in the service information 157.

The beacon 150 includes a preamble 151, a header 152, and beacon information 153.

The preamble 151 is information indicating the existence of a packet (beacon). In other words, each wireless communication apparatus constituting the communication system 100 is able to detect the existence of a beacon by receiving the preamble 151.

The header 152 is placed in a predetermined position of the packet, and stores information related to the packet (beacon) itself. For example, the header 152 stores information such as the source, destination, and size of the packet (information related to the packet (beacon) itself). In other words, each wireless communication apparatus constituting the communication system 100 decodes and analyzes the header. As a result of this analysis, each wireless communication apparatus constituting the communication system 100 is able to detect which wireless communication apparatus transmitted a signal addressed to which wireless communication apparatus, and also the signal type of the signal (such as whether or not the signal is a beacon).

The beacon information 153 is information to announce to each wireless communication apparatus constituting the communication system 100. In other words, each wireless communication apparatus constituting the communication system 100 includes and transmits information that should be announced to other wireless communication apparatuses in the beacon.

Next, the beacon information 153 will be described in detail.

The beacon information 153 includes time information 154, a network ID 155, a network attribute 156, service information 157, user information 158, and other information 159.

The time information 154 is time information indicating the time at which the beacon that includes the information was transmitted from the source wireless communication apparatus.

The network ID 155 is information indicating an ID of the network constituted by the source wireless communication apparatus.

The network attribute 156 is information indicating an attribute of the network constituted by the source wireless communication apparatus.

The service information 157 is information related to a service provided by the source wireless communication apparatus (service information).

The user information 158 is information related to a user who uses the source wireless communication apparatus (user information).

The other information 159 is information other than the above information.

Next, the service information 157 and the user information 158 will be described.

As illustrated in FIG. 7A, the service information 157 is made up of information fields, namely an element ID 160, a length 161, and service announcement fields [0] to [N] 162.

The element ID 160 is an element ID indicating that service information is stored.

The length 161 is a length indicating the length of the service information element.

The service announcement fields [0] to [N] 162 are made up of one or a plurality of (for example, N) service announcement fields. One service announcement field is placed for each service provided by the corresponding wireless communication apparatus. For example, three fields are placed for a wireless communication apparatus that provides three services.

The service announcement fields [0] to [N] 162 store a service type 163, a content ID 164, a content attribute 165, ranking information 166, a cache recommendation 167, a clone degree 168, and redistribution information 169. Note that each piece of information will be described in detail with reference to FIG. 8.

As illustrated in FIG. 7B, the user information 158 is made up of information fields, namely an element ID 170, a length 171, and IDs [0] to [M] 172.

The element ID 170 is an element ID indicating that user information is stored.

The length 171 is a length indicating the length of the user information element. The user ID fields [0] to [M] 172 are made up of one or a plurality of (for example, M) user ID fields. One user ID field is placed for each user ID registered by a user who uses the corresponding wireless communication apparatus. For example, there are placed a number of fields equal to the number of user IDs stored in the user ID 314 of the user information management table 310 illustrated in FIG. 3.

At this point, as illustrated in FIG. 3, the user information of multiple users may be registered in the user information management table 310. In this case, it may be configured so that only the user ID registered by the user who is actually using the first wireless communication apparatus 200 is transmitted. In other words, only a user ID field related to the user ID registered by the user who is actually using the first wireless communication apparatus 200 is placed.

The user ID fields [0] to [M] 172 store an ID class 173, a user ID 174, and related information 175. Herein, each of the ID class 173, the user ID 174, and the related information 175 stores each of the ID class 313, the user ID 314, and the related information 315 illustrated in FIG. 3, respectively.

Next, the service announcement field will be described with reference to FIG. 8.

The service type 163 is information for identifying the details of a service (such as content delivery). In addition, the service type 163 may also include information (limitation information to limit the forwarding count) indicating how many more times the discovery information may be forwarded. By including this limitation information, it is possible to prevent the service discovery information related to a service from being forwarded a number of times exceeding the count. Also, a wireless communication apparatus that receives the discovery information may also decide, on the basis of the information in the service type 163, whether or not to receive a service identified by the service type 163. Note that an example of forwarding discovery information will be illustrated in a second embodiment of the present technology.

The content ID 164 is an ID for identifying a service. A wireless communication apparatus that transmits or receives the discovery information manages the receiving of a service identified by the content ID 164 on the basis of the information of the content ID 164, and generates fee information as required.

The content attribute 165 is information that indicates the bit capacity required to provide the service, a group able to receive the service, an authentication method required to receive the service, and the like. Herein, the group able to receive the service may be, for example, friends (that is, the wireless communication apparatuses possessed by the friends) of the user who possesses the wireless communication apparatus that provides the service. In this case, an authentication method for identifying a friend may be used to judge whether or not a wireless communication apparatus belongs in the group. In addition, a group able to receive the service may also be taken to be the members of a designated service, for example. In this case, an authentication method that proves membership may be used to judge whether or not a wireless communication apparatus belongs in the group. In addition, a wireless communication apparatus that receives discovery information may also decide, on the basis of the information in the content attribute 165, whether or not to receive the corresponding service, or whether or not the corresponding service is receivable. In this way, the content attribute 165 is information indicating which wireless communication apparatuses may access the corresponding content, and in addition, how the corresponding content may be accessed.

The ranking information 166 is information that indicates the assessment of the service (content) (for example, whether the frequency of access to the service (content) is high or low). A wireless communication apparatus that transmits discovery information may decide, on the basis of the information in the ranking information 166, whether or not to announce the discovery information to the next wireless communication apparatus, or how frequently to announce the discovery information. A wireless communication apparatus that receives the discovery information may decide, on the basis of the information in the ranking information 166, whether or not to cache the received content. For example, it is preferable to configure the ranking information 166 so that high-ranking services are announced and received.

The cache recommendation 167 is information that indicates a recommendation of how much the service should be cached for neighboring wireless communication apparatuses (a recommended degree). A wireless communication apparatus that transmits discovery information configures a setting that raises the recommended degree in the case of judging that the service is accessed frequently and the service should be provided to other wireless communication apparatuses. Also, a wireless communication apparatus that receives the discovery information may decide, on the basis of the information in the cache recommendation 167, whether or not to receive and cache content.

The clone degree 168 is information that indicates how many times a service (content) has been copied from the original, or alternatively, how many more times copying is allowed. A wireless communication apparatus that receives the discovery information is controlled to be unable to store a copy equal to or greater than a count determined by the clone degree 168.

The redistribution information 169 is information that indicates whether or not a wireless communication apparatus that receives the discovery information may cache and redistribute a service (content). In a wireless communication apparatus that receives the discovery information, the need to cache and redistribute a service (content) is controlled on the basis of the information in the redistribution information 169.

For example, if the first wireless communication apparatus 200 illustrated in FIG. 1 broadcasts a beacon, the beacon is received by the surrounding wireless communication apparatuses (the second wireless communication apparatus 102 to the fourth wireless communication apparatus 104). Subsequently, the second wireless communication apparatus 102 to the fourth wireless communication apparatus 104 are able to detect, on the basis of the header of the received beacon, that the beacon is a beacon transmitted from the first wireless communication apparatus 200. Also, by checking the details of the beacon information 153 included in the received beacon, the second wireless communication apparatus 102 to the fourth wireless communication apparatus 104 are able to ascertain a service that the first wireless communication apparatus 200 is able to provide and the like.

For example, suppose a case in which the beacon 150 transmitted from the first wireless communication apparatus 200 is received by the second wireless communication apparatus 102 to the fourth wireless communication apparatus 104. In this case, the second wireless communication apparatus 102 to the fourth wireless communication apparatus 104 are able to detect, on the basis of the network attribute 156 included in the received beacon, that the source first wireless communication apparatus 200 exists as part of a network nearby. In addition, attributes of the network are identified by the network attribute 156.

In addition, the second wireless communication apparatus 102 to the fourth wireless communication apparatus 104 are able to acquire, on the basis of the service announcement fields 162 included in the received beacon 150, information related to various services receivable via the first wireless communication apparatus 200.

In addition, the second wireless communication apparatus 102 to the fourth wireless communication apparatus 104 are able to acquire, on the basis of the user ID fields 172 included in the received beacon 150, user information related to a user who uses the first wireless communication apparatus 200. Additionally, the second wireless communication apparatus 102 to the fourth wireless communication apparatus 104 are able to determine, on the basis of the acquired user information, whether or not to exchange services with the first wireless communication apparatus 200 using wireless communication.

[Example Display Screen for Registering User Information Using Received Discovery Information]

FIG. 9 is a diagram illustrating an example of a display screen (registration screen 350) displayed on a display unit 280 according to the first embodiment of the present technology.

The registration screen 350 is a display screen for registering user information using discovery information received by the first wireless communication apparatus 200. In addition, the registration screen 350 is displayed on the basis of discovery information (the service information 157 and the user information 158 illustrated in FIGS. 7A and 7B) that is transmitted from each wireless communication apparatus constituting the communication system 100.

On the registration screen 350, a registration selection 351, a service 352, a user ID 353, and related information 354 are displayed for each service (each source wireless communication apparatus). Also displayed on the registration screen 350 are an arrow button 355, an OK button 356, and a Back button 357.

The registration selection 351 is an area for selecting whether or not to register the user information of the user who uses the wireless communication apparatus that transmitted the discovery information. In the registration selection 351, radio buttons are displayed, for example, and either "Register" or "Do not register" is selected.

In the service 352, the service (a service that the first wireless communication apparatus 200 is able to receive) identified by the service information 157 (illustrated in FIGS. 7A and 7B) included in the received discovery information is displayed. The service is displayed on the basis of the discovery information (the service type 163 illustrated in FIGS. 7A and 7B), for example.

In the user ID 353, the content of the user ID 174 (illustrated in FIGS. 7A and 7B) included in the user information 158 (illustrated in FIGS. 7A and 7B) included in the received discovery information is displayed. Note that when multiple user ID fields are included in the user information 158 included in the received discovery information, each user ID is displayed.

In the related information 354, the content of the related information 175 (illustrated in FIGS. 7A and 7B) included in the user information 158 (illustrated in FIGS. 7A and 7B) included in the received discovery information is displayed. For example, if the related information 175 stores an image enabling one to grasp the user corresponding to the user ID (for example, a penguin, dog, or likeness), that image is displayed.

The arrow button 355 is a button pressed to display information related to other discovery information in the case of a large amount of received discovery information. When the arrow button 355 is pressed, information related to other discovery information is successively displayed in response to the pressing operation.

The OK button 356 is a button pressed when confirming whether or not to register entries selected by a user operation.

The Back button 357 is a button pressed when going back to the previously displayed display screen.

[Communication Example]

Figure 10:
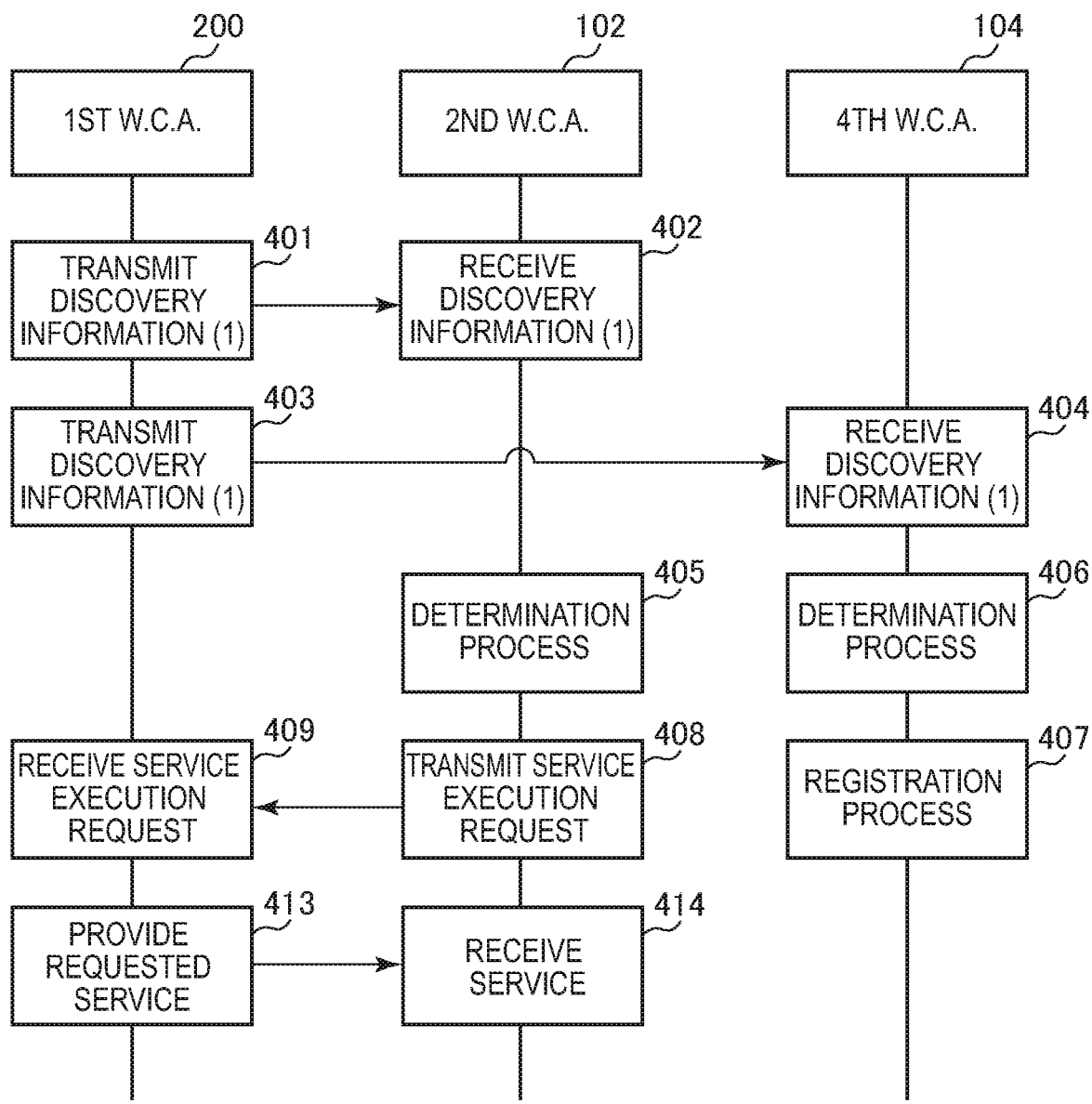
FIG. 10 is a sequence flowchart illustrating an exemplary communication process among apparatuses constituting a communication system 100 according to the first embodiment of the present technology.

FIG. 10 is a sequence flowchart illustrating an exemplary communication process among apparatuses constituting a communication system 100 according to the first embodiment of the present technology. Note that FIG. 10 illustrates an example communication process for a case in which the first wireless communication apparatus 200, the second wireless communication apparatus 102, and the fourth wireless communication apparatus 104 exist in the topology illustrated in FIG. 1. In addition, suppose that the user ID of the user who uses the first wireless communication apparatus 200 is stored in a friend list management table (corresponding to the friend list management table 320 illustrated in FIG. 4) provided in the second wireless communication apparatus 102. On the other hand, suppose that the user ID of the user who uses the first wireless communication apparatus 200 is not stored in either a friend list management table or a blocked list management table (corresponding to the blocked list management table 330 illustrated in FIG. 5) provided in the fourth wireless communication apparatus 104.

The first wireless communication apparatus 200 announces discovery information (including user information) to each wireless communication apparatus present nearby (401 to 404). For example, the first wireless communication apparatus 200 transmits a beacon including discovery information to the second wireless communication apparatus 102 and the fourth wireless communication apparatus 104 present nearby (401 to 404).

Note that in FIG. 10, a numeral representing the wireless communication apparatus that provides the service identified by the discovery information is indicated in parentheses following the term "discovery information". In other words, discovery information (1) indicates discovery information related to a service provided by the first wireless communication apparatus 200. Also, discovery information (2) indicates discovery information related to a service provided by the second wireless communication apparatus 102.

In addition, the discovery information (1) related to a service provided by the first wireless communication apparatus 200 is transmitted as the service information 157 and the user information 158 (illustrated in FIGS. 7A and 7B) (401 to 404). Note that the processing from 401 to 404 is one example of a communication step described in the claims. In addition, the processing in 401 and 403 is an example of a control step.

The second wireless communication apparatus 102 and the fourth wireless communication apparatus 104, by receiving the discovery information (1) from the first wireless communication apparatus 200, are able to detect what kind of service the source (first wireless communication apparatus 200) provides.

Also, the second wireless communication apparatus 102 and the fourth wireless communication apparatus 104 conduct a determination process on the basis of the user information included in the discovery information (1) from the first wireless communication apparatus 200 (405, 406).

Specifically, the second wireless communication apparatus 102 judges whether or not a match with the user ID included in the discovery information (1) from the first wireless communication apparatus 200 exists in the friend list management table (corresponding to the user ID 322 illustrated in FIG. 4) (405). As discussed earlier, the user ID of the user who uses the first wireless communication apparatus 200 is stored in a friend list management table provided in the second wireless communication apparatus 102. For this reason, the second wireless communication apparatus 102 judges that a match with the user ID included in the discovery information (1) from the first wireless communication apparatus 200 exists in the friend list management table (405).

In this way, if a matching user ID exists in the friend list management table (405), the second wireless communication apparatus 102 transmits a service execution request to the first wireless communication apparatus 200 (408, 409).

After receiving the service execution request (409), the first wireless communication apparatus 200 reads out content (including supplementary information) from the memory 300 according to the service execution request. Subsequently, the first wireless communication apparatus 200 transmits the read-out content (including supplementary information) to the second wireless communication apparatus 102 (413, 414). In other words, the first wireless communication apparatus 200 launches a procedure for establishing a communication link with the second wireless communication apparatus 102, transitions to a state enabling service provision, and exchanges data with the second wireless communication apparatus 102 (413, 414). Consequently, the second wireless communication apparatus 102 is able to receive the desired service (413, 414).

In this way, by mutually communicating discovery information, it is possible to discover adjacent wireless communication apparatuses and receivable services, and conduct peer-to-peer (P2P) communication.

Similarly, the fourth wireless communication apparatus 104 judges whether or not a match with the user ID included in the discovery information (1) from the first wireless communication apparatus 200 exists in the friend list management table (corresponding to the friend list management table 320 illustrated in FIG. 4) (406). As discussed earlier, the user ID of the user who uses the first wireless communication apparatus 200 is not stored in a friend list management table provided in the fourth wireless communication apparatus 104. For this reason, the fourth wireless communication apparatus 104 judges that a match with the user ID included in the discovery information (1) from the first wireless communication apparatus 200 does not exist in the friend list management table (406).

In this way, when a matching user ID does not exist in the friend list management table, the second wireless communication apparatus 102 conducts a determination process using a blocked list management table (corresponding to the blocked list management table 330 illustrated in FIG. 5) (406). In other words, the second wireless communication apparatus 102 judges whether or not a match with the user ID included in the discovery information (1) from the first wireless communication apparatus 200 exists in the blocked list management table (406).

As discussed earlier, the user ID of the user who uses the first wireless communication apparatus 200 is not stored in a blocked list management table provided in the fourth wireless communication apparatus 104. For this reason, the fourth wireless communication apparatus 104 judges that a match with the user ID included in the discovery information (1) from the first wireless communication apparatus 200 does not exist in the blocked list management table (406).

In this way, when a matching user ID does not exist in either the friend list management table or the blocked list management table (406), the fourth wireless communication apparatus 104 conducts a registration process (407).

Specifically, the fourth wireless communication apparatus 104 causes a registration screen to be displayed (for example, the registration screen 350 illustrated in FIG. 9). Subsequently, on the basis of user operations using the registration screen, the fourth wireless communication apparatus 104 conducts a registration process of registering the user ID included in the discovery information (1) in either the friend list management table or the blocked list management table (407). For example, when a user operation for registering an entry in the friend list management table is conducted, the user ID included in the discovery information (1) is stored in the friend list management table (corresponding to the user ID 322 illustrated in FIG. 4). On the other hand, when a user operation for registering an entry in the blocked list management table is conducted, the user ID included in the discovery information (1) is stored in the blocked list management table (corresponding to the user ID 332 illustrated in FIG. 5). Note that a user operation that does not register an entry in either the friend list management table or the blocked list management table may also be conducted. As another example, when multiple friend list management tables (for example, multiple friend list management tables according to the closeness of a friend) are provided, the registration process is conducted by conducting a user operation corresponding to each. In addition, when the user ID included in the discovery information (1) is registered in the friend list management table according to a user operation, the fourth wireless communication apparatus 104 may transmit a service execution request to the first wireless communication apparatus 200. The transmission of the service execution request and thereafter in this case is similar to the processing in 408, 409, 413, and 414.

In this way, the control unit 240 associates service information for identifying a service provided by the first wireless communication apparatus 200 with user information for identifying a user who uses the first wireless communication apparatus 200, and includes and transmits the associated information in discovery information. In addition, the control unit 240 judges, on the basis of user information included in discovery information, whether or not to receive a service according to service information associated with the user information from the other wireless communication apparatus that transmitted the discovery information.

For example, the control unit 240 is able to judge whether or not to receive a service, on the basis of whether or not user information registered in the friend list management table 320 matches user information included in received discovery information. As another example, the control unit 240 is able to judge whether or not to receive a service, on the basis of whether or not user information registered in the blocked list management table 330 matches user information included in received data.

Note that FIG. 10 illustrates an example of registering an entry in a friend list management table or a blocked list management table on the basis of a user operation. However, when a matching user ID does not exist in either the friend list management table or the blocked list management table (406), the fourth wireless communication apparatus 104 may also automatically register the user ID in the blocked list management table (407). In this case, it is preferable to inform the user before the registration process that the user ID will be registered in the blocked list management table.

[Communication Example]

Figure 11:
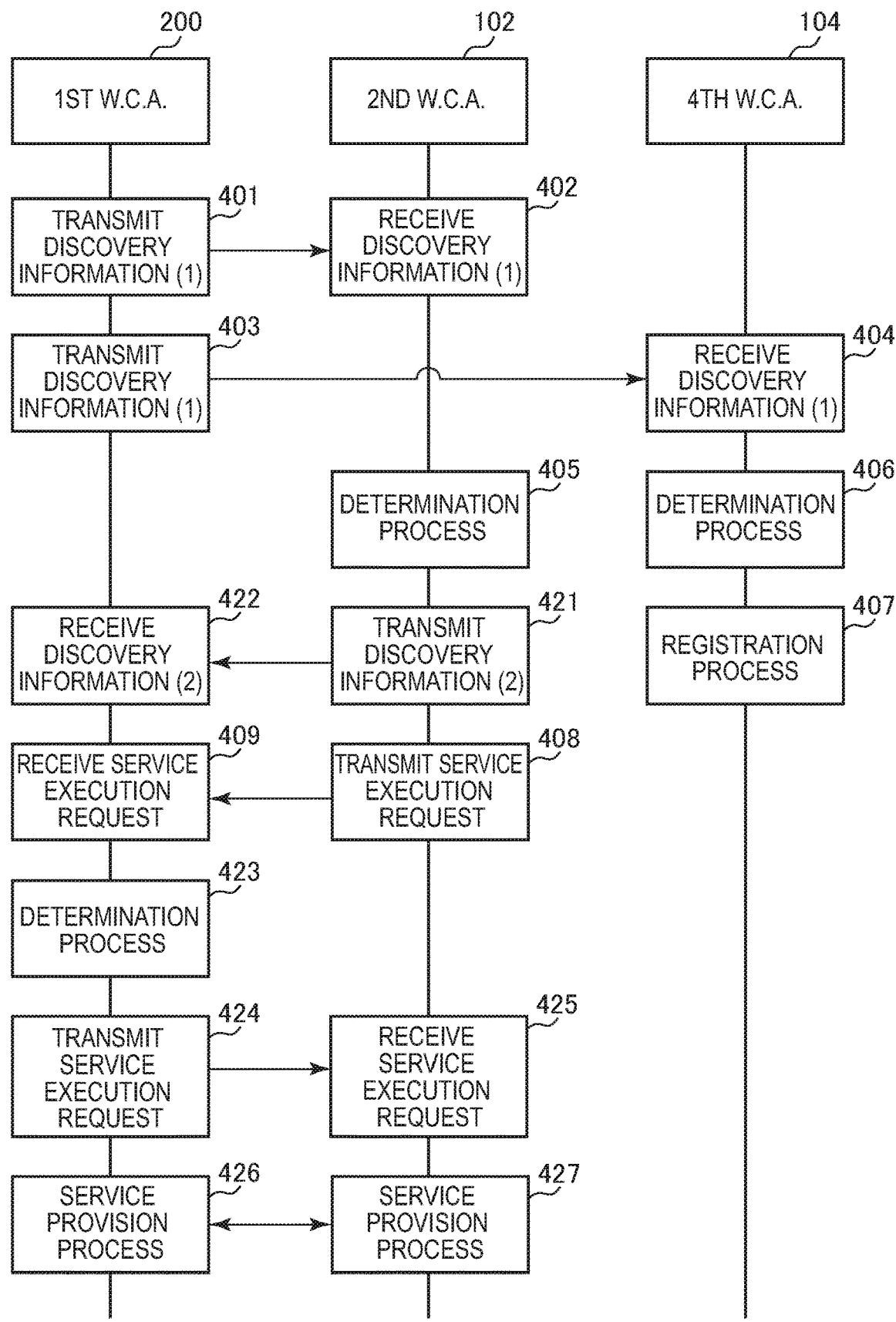
FIG. 11 is a sequence flowchart illustrating an exemplary communication process among apparatuses constituting a communication system 100 according to the first embodiment of the present technology.

FIG. 10 illustrates an example of starting the provision of a service on the basis of only a match determination at the wireless communication apparatus on the receiving side. However, the provision of a service may also be started on the basis of a match determination at the wireless communication apparatuses on both the transmitting side and the receiving side. In other words, the provision of a service may be started on the condition that the user ID of the user using the wireless communication apparatus acting as communication peer is registered in a friend list management table on both the transmitting side and the receiving side. FIG. 11 illustrates such a communication example.

FIG. 11 is a sequence flowchart illustrating an exemplary communication process among apparatuses constituting a communication system 100 according to the first embodiment of the present technology. Note that since the exemplary communication process illustrated in FIG. 11 is partial modification of the communication process illustrated in FIG. 10, the parts shared in common with the communication process illustrated in FIG. 10 are denoted with the same signs, and some of the description thereof will be reduced or omitted. In addition, suppose that the user ID of the user who uses the second wireless communication apparatus 102 is stored in the friend list management table 320 (illustrated in FIG. 4) provided in the first wireless communication apparatus 200.

If a matching user ID exists in the friend list management table (405), the second wireless communication apparatus 102, in order to report its own presence, transmits discovery information (including user information) to the first wireless communication apparatus 200 (421, 422). Note that the second wireless communication apparatus 102 may also transmit discovery information to the first wireless communication apparatus 200 by announcing discovery information to each wireless communication apparatus present nearby (for example, by transmitting a beacon) (421, 422).

In addition, if a matching user ID exists in the friend list management table (405), the second wireless communication apparatus 102 transmits a service execution request in order to establish a relationship of exchanging services with the first wireless communication apparatus 200 (408, 409).

The first wireless communication apparatus 200, by receiving the discovery information (2) from the second wireless communication apparatus 102, is able to detect what kind of service the source (second wireless communication apparatus 102) provides.

Also, the first wireless communication apparatus 200 conducts a determination process using the user ID included in the discovery information (2) from the second wireless communication apparatus 102 (423). Note that this determination process (423) is similar to the determination process (405) discussed earlier.

As discussed earlier, the user ID of the user who uses the second wireless communication apparatus 102 is stored in the friend list management table 320 provided in the first wireless communication apparatus 200. For this reason, the first wireless communication apparatus 200 judges that a match with the user ID included in the discovery information (2) from the second wireless communication apparatus 102 exists in the friend list management table 320 (423).

Additionally, if a matching user ID exists in the friend list management table 320 (423), the first wireless communication apparatus 200 transmits a service execution request in order to establish a relationship of exchanging services with the second wireless communication apparatus 102 (424, 425).

In this way, a service execution request is transmitted from each of the first wireless communication apparatus 200 and the second wireless communication apparatus 102 to the peer apparatus (408, 409, 424, 425). Consequently, service execution between the first wireless communication apparatus 200 and the second wireless communication apparatus 102 is granted, the apparatuses both transition to a state enabling service provision with each other, and data is exchanged between the first wireless communication apparatus 200 and the second wireless communication apparatus 102 (426, 427). Consequently, the second wireless communication apparatus 102 is able to receive the desired service (426, 427).

In other words, user information is checked between two wireless communication apparatuses acting as communication peers, and the provision of a desired service may be started only in the case of judging that the users who use the respective wireless communication apparatuses belong to the same group.

[Example Operation of Wireless Communication Apparatus]

Figure 12:
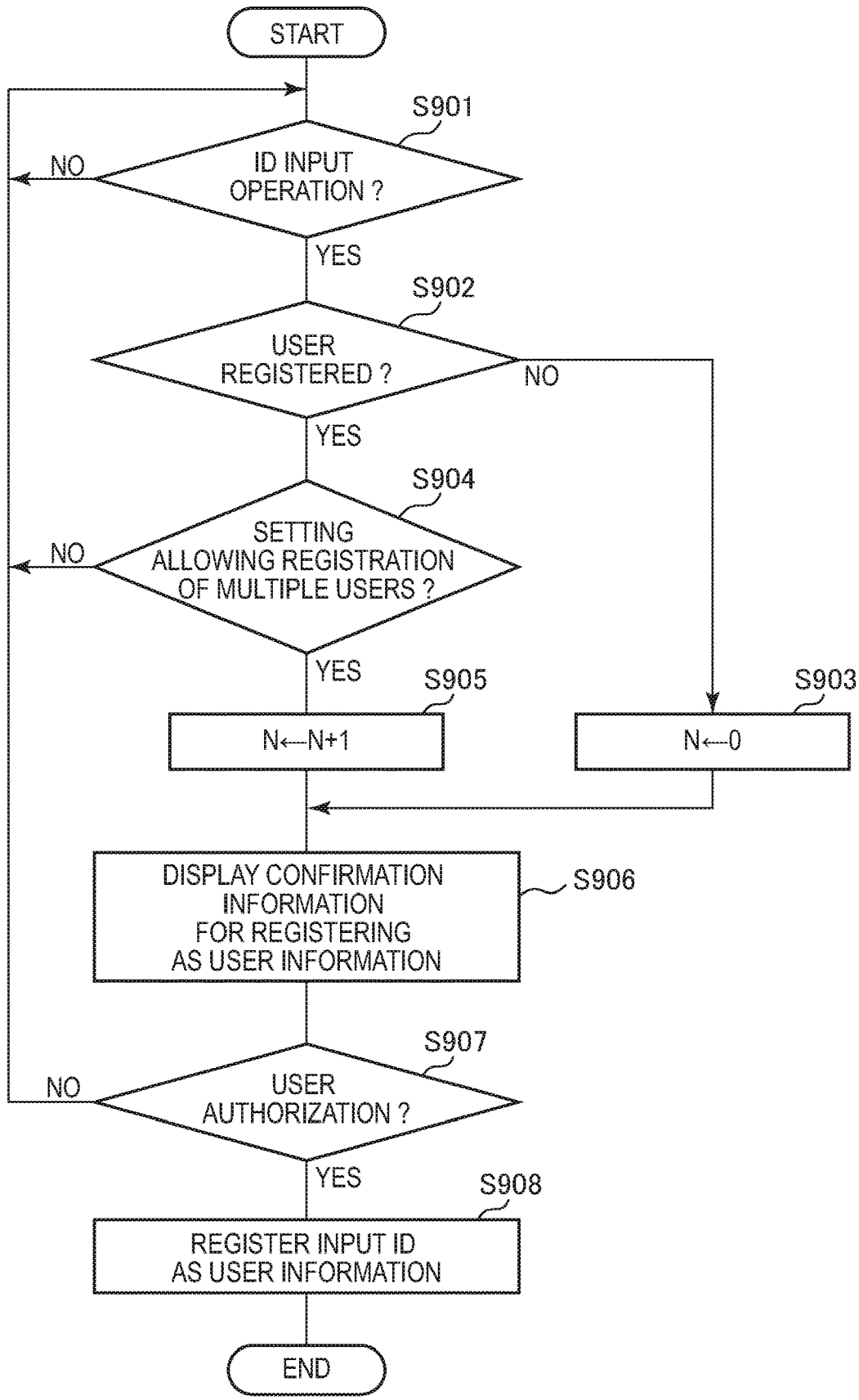
FIG. 12 is a flowchart illustrating an example of a processing sequence of a user information registration process by a first wireless communication apparatus 200 according to the first embodiment of the present technology.

FIG. 12 is a flowchart illustrating an example of a processing sequence of a user information registration process by a first wireless communication apparatus 200 according to the first embodiment of the present technology. FIG. 12 illustrates an example in which some kind of ID is input into the first wireless communication apparatus 200, and that ID (user ID) is registered as user information. Also, FIG. 12 illustrates an example of registering one user ID for one user.

First, the control unit 240 judges whether or not an input operation (including input by autocomplete or the like) of some kind of ID (for example, an email address, or an ID used for web access) has been conducted (step S901). For example, suppose that in the first wireless communication apparatus 200, a program for registering user information continually runs in the background and monitors whether an input operation of some kind of ID has been conducted. Subsequently, when an input operation of some kind of ID is not conducted (step S901), the monitoring continues.

Meanwhile, when an input operation of some kind of ID is conducted (step S901), the control unit 240 judges whether or not the user is registered in the user information management table 310 (illustrated in FIG. 3) (step S902). Subsequently, if the user is not registered in the user information management table 310 (step S902), N (the management information 311 illustrated in FIG. 3) is initialized to "0" (step S903).

Next, the control unit 240 causes the display unit 280 to display confirmation information for registering the ID input by an input operation as user information (step S906). At this point, if the ID input by an input operation is registered as user information, the ID may be included in discovery information and transmitted, and the ID may be displayed on another wireless communication apparatus. For this reason, a confirmation screen is displayed to enable the user to authorize whether or not the ID input by an input operation may be used as user information to include in discovery information (whether or not the ID may be disclosed to other users), and user authorization is obtained. Also, an operating button for performing an authorization operation (for example, a button that authorizes, and a button that does not authorize) may be displayed together with the confirmation information, for example.

Next, the control unit 240 judges whether or not the user conducted an authorization operation after the confirmation information was displayed on the display unit 280 (step S907). Subsequently, if the user did not conduct an authorization operation (in other words, if an operation indicating non-authorization is conducted) (step S907), the ID input by an input operation is not registered as user information, and thus the process returns to step S901. On the other hand, if the user conducted an authorization operation (step S907), the control unit 240 conducts a registration process for registering the ID input by an input operation as user information (step S908). For example, the ID input by an input operation is stored in the user ID 314 corresponding to the management information 311 "N" of the user information management table 310 illustrated in FIG. 3. Also, the class of the ID input by an input operation is stored in the ID class 313. Also, other information is stored as necessary, by user operations or automatically.

Meanwhile, if the user is not registered in the user information management table 310 (step S902), the control unit 240 judges whether or not a setting allowing the registration of multiple users is configured (step S904). This setting is configured by a user operation in advance. Subsequently, if a setting allowing the registration of multiple users is not configured (in other words, if a setting that only registers one user is configured) (step S904), the ID input by an input operation is not registered as user information, and thus the process returns to step S901. On the other hand, if a setting allowing the registration of multiple users is configured (step S904), N (the management information 311 illustrated in FIG. 3) is incremented by "1" (step S905), and the process proceeds to step S906.

Note that, as illustrated in FIG. 3, it is also possible to register multiple user IDs for one user. In this case, a user operation may be performed to select the user under which to register the user information from among the already registered users, and the user information may be registered under the user selected by the user operation. As another example, by monitoring an ID input by a user (for example, monitoring a login ID or the like), it is possible to judge which user from among the already registered users.

[Example Operation of Wireless Communication Apparatus]

Figure 13:
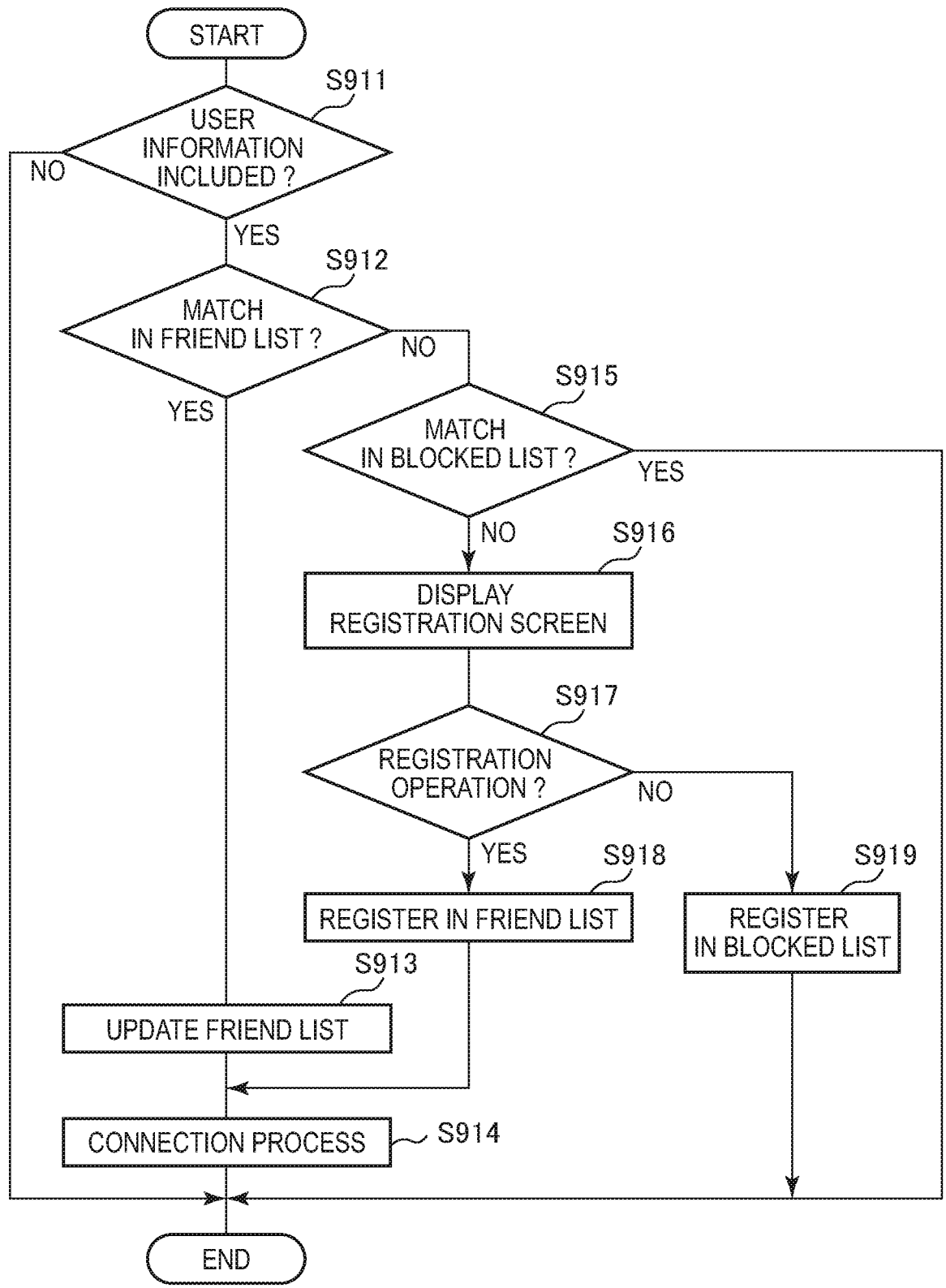
FIG. 13 is a flowchart illustrating an example of a processing sequence of a data communication process by a first wireless communication apparatus 200 according to the first embodiment of the present technology.

FIG. 13 is a flowchart illustrating an example of a processing sequence of a data communication process by a first wireless communication apparatus 200 according to the first embodiment of the present technology. FIG. 13 illustrates an example of a data communication process when the first wireless communication apparatus 200 receives discovery information (included in a beacon, for example).

First, the control unit 240 judges whether or not user information (the user information 158 illustrated in FIGS. 7A and 7B) is included in the discovery information (step S911). Subsequently, if user information is not included in the discovery information (step S911), the operation of the data communication process ends.

On the other hand, if user information is included in the discovery information (step S911), the control unit 240 judges whether or not a match with the user ID included in the user information exists in the friend list management table 320 (illustrated in FIG. 4) (step S912). In other words, it is judged whether or not a connection should be made with the wireless communication apparatus that transmitted the discovery information. Specifically, the user ID included in the user information (the user ID 174 illustrated in FIG. 7B) is successively compared to each user ID stored in the user ID 322 of the friend list management table 320. Subsequently, it is judged whether or not a matching user ID exists in the friend list management table 320.

If a matching user ID exists in the friend list management table 320 (step S912), the control unit 240 updates the friend list management table 320 (step S913). Specifically, the control unit 240 performs an update by logging the communication time in the communication history information 323 of the friend list management table 320 (step S913).

Next, the control unit 240 conducts a connection process for using wireless communication to connect to the wireless communication apparatus that transmitted the discovery information (step S914). Note that it is possible to judge whether or not to receive a service from the wireless communication apparatus connected by the connection process, on the basis of service information included in the discovery information (the service information 157 illustrated in FIGS. 7A and 7B). In addition, the user information and the service information included in the discovery information may also be used to judge whether or not a connection should be made with the wireless communication apparatus that transmitted the discovery information.

Meanwhile, if a matching user ID does not exist in the friend list management table 320 (step S912), a match determination using the blocked list management table 330 (illustrated in FIG. 5) is conducted (step S915). In other words, the control unit 240 judges whether or not a match with the user ID included in the user information exists in the blocked list management table 330 (illustrated in FIG. 5) (step S915). Specifically, the user ID included in the user information (the user ID 174 illustrated in FIG. 7B) is successively compared to each user ID stored in the user ID 332 of the blocked list management table 330. Subsequently, it is judged whether or not a matching user ID exists in the blocked list management table 330.

If a matching user ID exists in the blocked list management table 330 (step S915), the operation of the data communication process ends. In other words, a connection process is not conducted with the wireless communication apparatus that transmitted the discovery information.

Meanwhile, if a matching user ID does not exist in the blocked list management table 330 (step S915), the control unit 240 causes the display unit 280 to display a registration screen for registering the user information included in the discovery information (step S916). For example, the registration screen 350 illustrated in FIG. 9 is displayed.

Next, the control unit 240 judges whether or not a registration operation for registering the user information included in the discovery information has been conducted (step S917). For example, if an operation of selecting the "Register" option of the registration selection 351 illustrated in FIG. 9 is conducted, and an operation of pressing the OK button 356 is conducted, it is judged that a registration operation was conducted. On the other hand, if an operation of selecting the "Do not register" option of the registration selection 351 illustrated in FIG. 9 is conducted, and an operation of pressing the OK button 356 is conducted, it is judged that a registration operation was not conducted.

Subsequently, is a registration operation is conducted (step S917), the control unit 240 conducts a registration process of registering the user information included in the discovery information in the friend list management table 320 (step S918). For example, the user ID included in the user information (the user ID 174 illustrated in FIG. 7B) is stored in the user ID 322 illustrated in FIG. 4. In this case, the same ID class 321 (illustrated in FIG. 4) as the ID class included in the user information (the ID class 173 illustrated in FIGS. 7A and 7B) is stored in association. Also, the communication time is logged in the communication history information 323 illustrated in FIG. 4. Next, the control unit 240 conducts a connection process for using wireless communication to connect to the wireless communication apparatus that transmitted the discovery information (step S914).

Meanwhile, if a registration operation is not conducted (step S917), the control unit 240 conducts a registration process of registering the user information included in the discovery information in the blocked list management table 330 (step S919). For example, the user ID included in the user information (the user ID 174 illustrated in FIG. 7B) is stored in the user ID 332 illustrated in FIG. 5. In this case, the same ID class 331 (illustrated in FIG. 5) as the ID class included in the user information (the ID class 173 illustrated in FIGS. 7A and 7B) is stored in association.

Note that FIG. 13 illustrates an example of registering user information for which a matching user ID does not exist in either the friend list management table 320 or the blocked list management table 330 in either table on the basis of a user operation. However, the inability to conduct such a user operation every time discovery information is received is also anticipated. For this reason, regarding user information for which a matching user ID does not exist, it may be configured so that such user information is not registered in either of the friend list management table 320 and the blocked list management table 330.

Also, although FIG. 13 illustrates an example of judging whether or not to register user information included in discovery information every time the discovery information is received, a registration operation may also be conducted all at once on multiple sets of user information.

[Example of Conducting Match Determination Using External Apparatus]

The foregoing illustrates an example of conducting a match determination using a friend list management table provided in each wireless communication apparatus. However, a match determination may also be conducted using an external apparatus. For example, a wireless communication apparatus may use wireless communication to connect to an external apparatus, the external apparatus may conduct a match determination using information provided in the external apparatus (for example, information corresponding to a friend list management table), and the wireless communication apparatus may receive and use the determination result. Accordingly, FIG. 14 illustrates an example of conducting a match determination using an external apparatus.

[Exemplary Configuration of Communication System]

FIG. 14 is a diagram that illustrates an exemplary system configuration of a communication system 400 according to a modification of the first embodiment of the present technology.

The communication system 400 is equipped with a friend list management server 410, a public network 420, a communication control apparatus 430, a base station 431, a plurality of wireless communication apparatuses (first wireless communication apparatus 200, second wireless communication apparatus 102, third wireless communication apparatus 103, and 4th wireless communication apparatus 104).

The public network 420 is a public network such as a telephone network or the Internet. In addition, the public network 420 and the communication control apparatus 430 are connected via a gateway (not illustrated).

The communication control apparatus 430 is a communication control apparatus managed by a telecommunications carrier that provides wireless communication services, and conducts authentication control of wireless communication apparatuses connected via the base station 431. Additionally, the communication control apparatus 430 connects an authenticated wireless communication apparatus to the public network 420 via a gateway (not illustrated).

In addition, the communication control apparatus 430 outputs various information transmitted from each wireless communication apparatus via the base station 431 to the friend list management server 410. In addition, the communication control apparatus 430 transmits various information output from the friend list management server 410 to each wireless communication apparatus via the base station 431.

The base station 431 is a base station operated by the telecommunications carrier. In other words, the base station 431 is mobile communication base station (NodeB or eNodeB) that connects, via a wireless link, a wireless communication apparatus holding contracted authentication information according to the telecommunications carrier to the communication control apparatus 430 operated by the telecommunications carrier.

The friend list management server 410 is equipped with a friend list management database 411 and a determination unit 412.

The friend list management database 411 is a database for managing, for each wireless communication apparatus, information related to a user who uses each wireless communication apparatus (user information). Note that the managed content of the friend list management database 411 will be described in detail with reference to FIG. 15.

The determination unit 412 conducts a determination process using the friend list management database 411 in response to a query from a wireless communication apparatus, and transmits the determination result to the wireless communication apparatus that transmitted the query. Note that the determination process by the determination unit 412 is similar to the determination process discussed earlier.

In addition, each wireless communication apparatus (first wireless communication apparatus 200, second wireless communication apparatus 102, third wireless communication apparatus 103, and fourth wireless communication apparatus 104) is approximately similar to FIG. 1. For this reason, the parts shared in common with the wireless communication apparatus illustrated in FIGS. 1 and 2 are denoted with the same signs, and some of the description thereof will be reduced or omitted.

However, suppose that the communication unit 220 of the first wireless communication apparatus 200 (illustrated in FIG. 2) is equipped with a communication function for communicating with an access point or the like of a mobile phone network or a public wireless LAN. For example, the communication unit 220 of the first wireless communication apparatus 200 is equipped with a communication function such as 3rd Generation (3G), Long Term Evolution (LTE), or Wireless Fidelity (WiFi, registered trademark). In this case, the first wireless communication apparatus 200 is able to access the Internet via the mobile phone network or the public wireless LAN. In addition, the first wireless communication apparatus 200 is able to access the friend list management server 410 via the base station 431, for example.

[Example Content of Friend List Management Database]

FIG. 15 is a diagram that schematically illustrates an example of managed content in a friend list management database 411 stored in memory 300 according to a modification of the first embodiment of the present technology.

The friend list management database 411 is a database for managing peers (for example, friends and acquaintances of the user) permitted to use a wireless communication apparatus to receive various services.

Specifically, in the friend list management database 411, a terminal ID 415, an ID class 416, and a user ID 417 are sorted by each wireless communication apparatus and stored in association with each other.

The terminal ID 415 is terminal identification information (for example, a device-specific ID) for identifying a wireless communication apparatus. The terminal ID 415 stores an International Mobile Equipment Identity (IMEI), for example. Note that although an IMEI is expressed as a 15-digit number, for the sake of simplicity, FIG. 15 illustrates only a comparatively simple number for the terminal ID 415. Also, as an example, suppose that the terminal ID 415 "1234" corresponds to the first wireless communication apparatus 200.

Note that the ID class 416 and the user ID 417 correspond to the ID class 321 and the user ID 322 illustrated in FIG. 4.

[Example Operation of Wireless Communication Apparatus]

Figure 16:
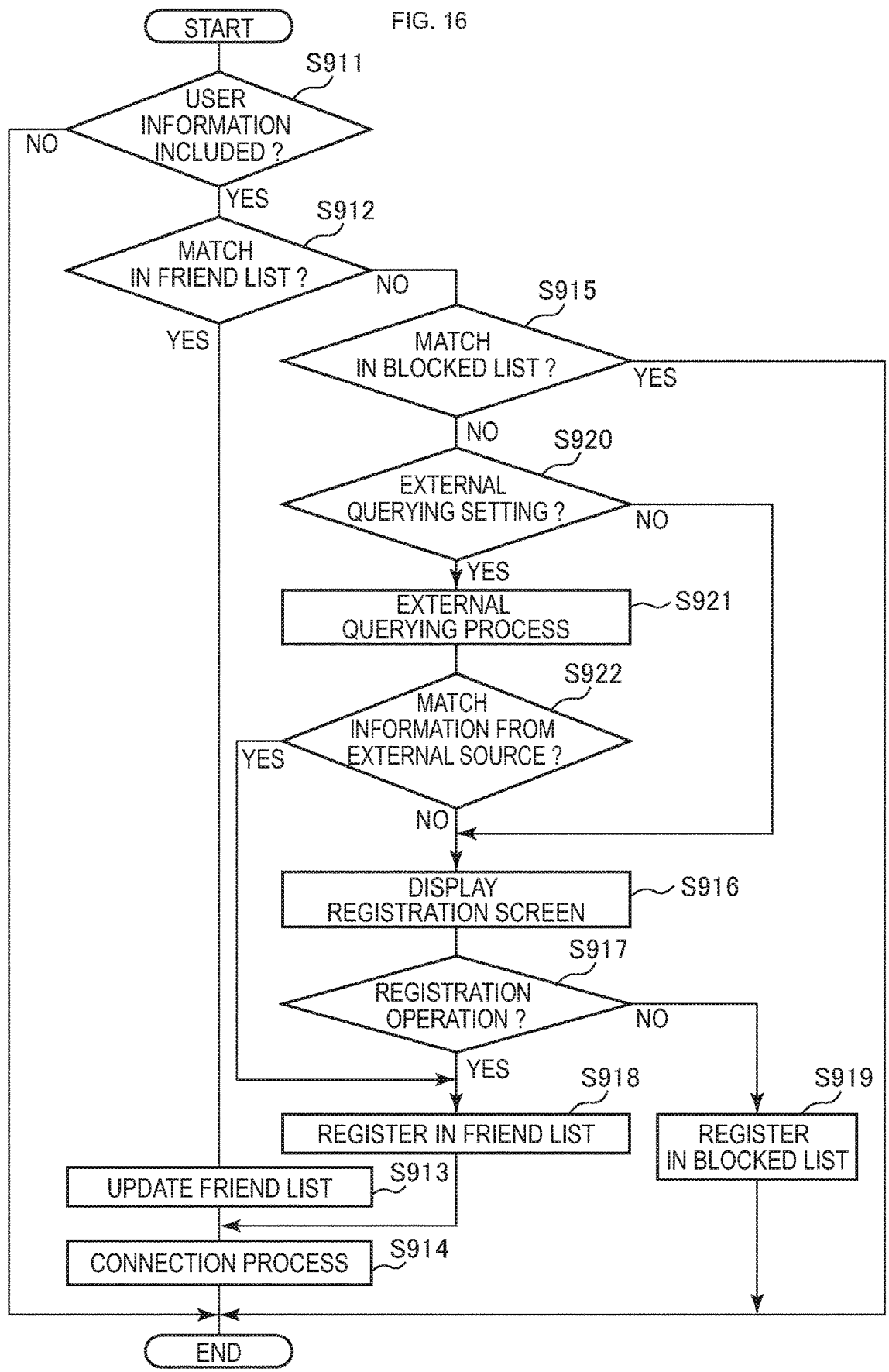
FIG. 16 is a flowchart illustrating an example of a processing sequence of a data communication process by a first wireless communication apparatus 200 according to a modification of the first embodiment of the present technology.

FIG. 16 is a flowchart illustrating an example of a processing sequence of a data communication process by a first wireless communication apparatus 200 according to a modification of the first embodiment of the present technology. Note that this processing sequence is a partial modification of the processing sequence illustrated in FIG. 13. For this reason, the parts shared in common with the processing sequence illustrated in FIG. 13 are denoted with the same signs, and some of the description thereof will be reduced or omitted.

If a matching user ID does not exist in the blocked list management table 330 (step S915), the control unit 240 judges whether or not a setting allowing external querying is configured (step S920). This setting is configured by a user operation in advance. As another example, the control unit 240 may judge whether or not external querying is available, and if external querying is available, confirm with the user whether or not to conduct external querying. In addition, if a setting allowing external querying is not configured (in other words, if a setting prohibiting external querying is configured) (step S920), the process proceeds to step S916.

Meanwhile, if a setting allowing external querying is configured (step S920), the control unit 240 conducts an external querying process (step S921). Specifically, the control unit 240 accesses the friend list management server 410 via the base station 431, and transmits user information included in discovery information to the determination unit 412 of the friend list management server 410 (step S921).

Upon receiving the user information, the determination unit 412 judges whether or not a match with the user ID included in the user information exists in the friend list management database 411 (illustrated in FIG. 14). Subsequently, if a matching user ID exists in the friend list management database 411, the determination unit 412 transmits a determination result indicating that a matching user ID exists (match information) to the first wireless communication apparatus 200 via the base station 431. On the other hand, if a matching user ID does not exist in the friend list management database 411, the determination unit 412 transmits a determination result indicating that a matching user ID does not exist (non-match information) to the first wireless communication apparatus 200 via the base station 431.

Next, the control unit 240 judges whether or not match information was received after the external querying process (step S922). Subsequently, if match information was not received (in other words, if non-match information was received) (step S922), the process proceeds to step S916. On the other hand, if match information was received (step S922), the process proceeds to step S918.

Note that although FIG. 16 illustrates an example of automatically registering user information included in discovery information in the friend list management table 320 if match information is received after an external querying process, the registration may also be conducted after a confirmation operation by the user. In addition, when non-match information is received after an external querying process, user information included in discovery information may be registered automatically or manually in the blocked list management table 330. Consequently, when the same user information is received, conducting another external query is not necessary.

In addition, FIG. 16 illustrates an example in which the friend list management server 410 conducts a determination process using the friend list management database 411 when a matching user ID does not exist in either the friend list management table 320 or the blocked list management table 330. However, user information stored in the friend list management database 411 may also be supplied to the first wireless communication apparatus 200, and the first wireless communication apparatus 200 may use the supplied user information to conduct a determination process. Note that user information supplied to the first wireless communication apparatus 200 may be taken to be only information that does not pose a security problem (for example, information that has been authorized in advance by the user).

Note that recently, technology that registers a friend list using a social network service (SNS) has proliferated widely. For this reason, an SNS may also be used to conduct a match determination.

2. Second Embodiment

The first embodiment of the present technology illustrates an example in which only user information provided in the wireless communication apparatus (local apparatus) that is the transmission source of discovery information is included in the discovery information and transmitted. At this point, as discussed earlier, it is possible to include and transmit service information provided by a wireless communication apparatus (other apparatus) other than the wireless communication apparatus (local apparatus) that is the transmission source of discovery information in the discovery information. For this reason, as an example, it is conceivable to include and transmit user information provided in a wireless communication apparatus (other apparatus) other than the wireless communication apparatus (local apparatus) that is the transmission source of discovery information in the discovery information.

Accordingly, a second embodiment of the present technology illustrates an example in which user information provided in a wireless communication apparatus (other apparatus) other than the wireless communication apparatus (local apparatus) that is the transmission source of discovery information is included in the discovery information and transmitted. Note that the communication system according to the second embodiment of the present technology is approximately similar to the communication system 100 illustrated in FIG. 1. For this reason, the parts shared in common with the communication system 100 are denoted with the same signs, and some of the description thereof will be reduced or omitted.

[Example Format of Discovery Information]

Figure 17:
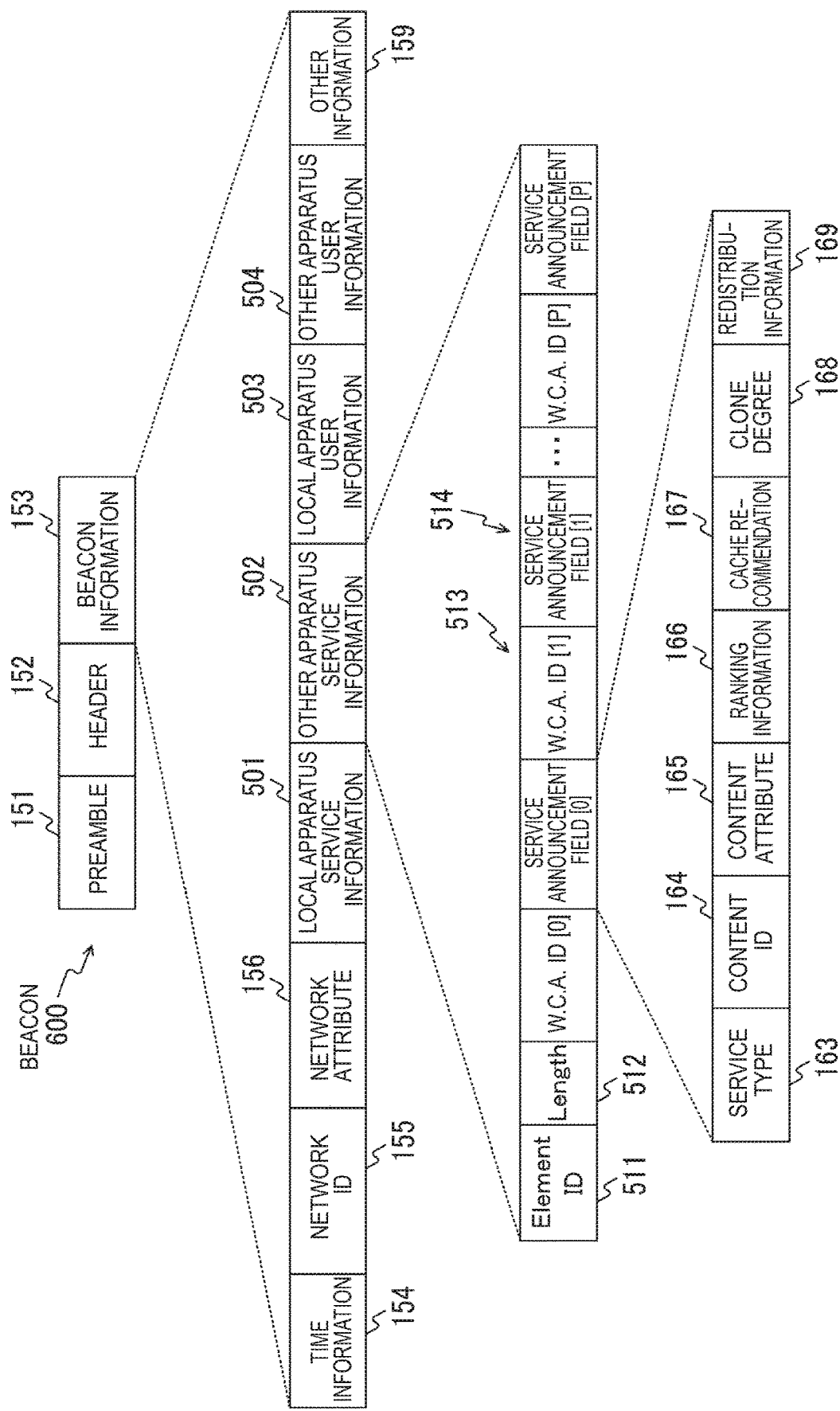
FIG. 17 is a diagram illustrating an example format of a beacon transmitted by each wireless communication apparatus constituting a communication system 100 according to a second embodiment of the present technology.
Figure 18:
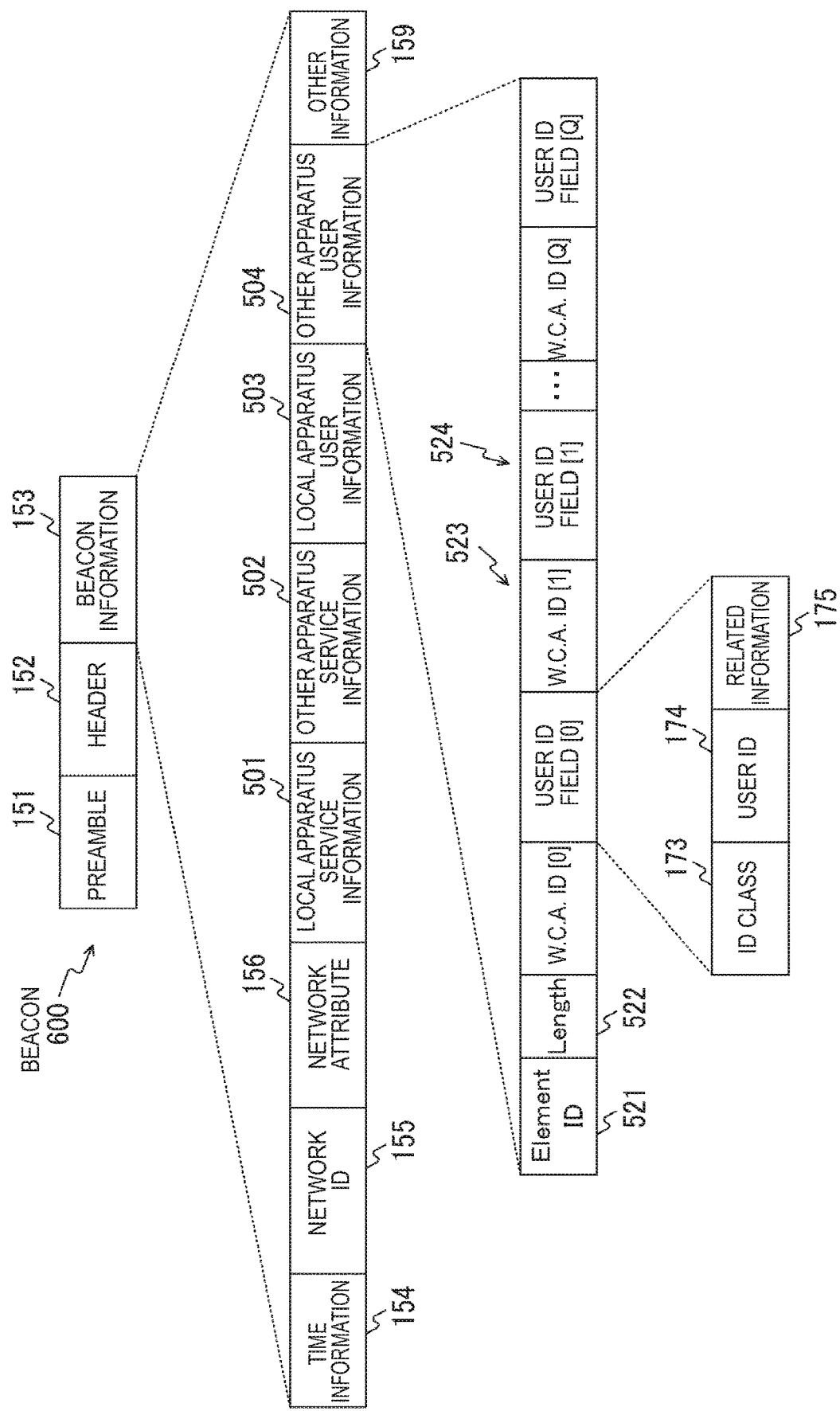
FIG. 18 is a diagram illustrating an example format of a beacon transmitted by each wireless communication apparatus constituting a communication system 100 according to the second embodiment of the present technology.

FIGS. 17 and 18 are diagrams illustrating an example format of a beacon transmitted by each wireless communication apparatus constituting a communication system 100 according to the second embodiment of the present technology. Note that FIG. 17 illustrates an example format of other apparatus service information 502 included in a beacon 600, while FIG. 18 illustrates an example format of other apparatus user information 504 included in a beacon 600. Also, the beacon 600 is a partial modification of the beacon 150 illustrated in FIGS. 7A and 7B. For this reason, the parts shared in common with the beacon 150 are denoted with the same signs, and some of the description thereof will be reduced or omitted.

The beacon 600 is the result of treating the service information 157 in the beacon 150 illustrated in FIGS. 7A and 7B as local apparatus service information 501, treating the user information 158 as local apparatus user information 503, and adding other apparatus service information 502 and other apparatus user information 504.

The other apparatus service information 502 is information related to a service provided by a wireless communication apparatus present near the source wireless communication apparatus (other apparatus service information). Note that the local apparatus service information 501 and the other apparatus service information 502 corresponds to the discovery information.

As illustrated in FIG. 17, the other apparatus service information 502 is made up of information fields, namely an element ID 511, a length 512, wireless communication apparatus IDs [0] to [P] 513, and service announcement fields [0] to [P] 514.

Note that the other apparatus service information 502 stores information that is basically similar to the local apparatus service information 501 (same as the service information 157 illustrated in FIG. 7A), but differs by additionally storing the wireless communication apparatus IDs [0] to [P] 513. In other words, the element ID 511 and the length 512 correspond to the element ID 160 and the length 161 illustrated in FIG. 7A. In addition, the wireless communication apparatus IDs [0] to [P] 513 and the service announcement fields [0] to [P] 514 are placed in pairs for each service provided by a wireless communication apparatus.

The wireless communication apparatus IDs [0] to [P] 513 are an ID for identifying a corresponding wireless communication apparatus (for example, a nearby wireless communication apparatus). In other words, the wireless communication apparatus IDs [0] to [P] 513 are information indicating which wireless communication apparatus provides the service of the paired service announcement field.

The service announcement fields [0] to [P] 514 are made up of one or a plurality of (for example, P) service announcement fields. Note that the service announcement fields [0] to [P] 514 are similar to the service announcement fields [0] to [N] 162 illustrated in FIG. 7A, except that information related to another wireless communication apparatus (a wireless communication apparatus other than the wireless communication apparatus that transmits the beacon) is stored.

In other words, the combinations of the wireless communication apparatus IDs [0] to [P] 513 and the service announcement fields [0] to [P] 514 (that is, P combinations) are equal to the number of services that should be reported to the wireless communication apparatus that transmits the beacon.

The other apparatus user information 504 is information related to a user who uses a wireless communication apparatus present near the source wireless communication apparatus (other apparatus user information). Note that the local apparatus user information 503 and the other apparatus user information 504 corresponds to the discovery information.

As illustrated in FIG. 18, the other apparatus user information 504 is made up of information fields, namely an element ID 521, a length 522, wireless communication apparatus IDs [0] to [Q] 523, and user ID fields [0] to [Q] 524.

Note that the other device user information 504 stores information that is basically similar to the local device user information 503 (the same as the user information 158 illustrated in FIG. 7B), but differs by additionally storing the wireless communication apparatus IDs [0] to [Q] 524. In other words, the element ID 521 and the length 522 correspond to the element ID 170 and the length 171 illustrated in FIG. 7B. In addition, the wireless communication apparatus IDs [0] to [Q] 523 and the user ID fields [0] to [Q] 524 are placed in pairs for each user ID of a user who uses a wireless communication apparatus.

The wireless communication apparatus IDs [0] to [Q] 523 are an ID for identifying a corresponding wireless communication apparatus (for example, a nearby wireless communication apparatus). In other words, the wireless communication apparatus IDs [0] to [Q] 523 are information indicating which wireless communication apparatus includes the user ID of the paired user ID field.

The user ID fields [0] to [Q] 524 are made up of one or a plurality of (for example, Q) user ID fields. Note that the user ID fields [0] to [Q] 524 are similar to the user ID fields [0] to [M] 172 illustrated in FIG. 7B, except that information related to another wireless communication apparatus (a wireless communication apparatus other than the wireless communication apparatus that transmits the beacon) is stored.

In other words, the combinations of the wireless communication apparatus IDs [0] to [Q] 523 and the user ID fields [0] to [Q] 524 (that is, Q combinations) are equal to the number of user IDs that should be announced by the wireless communication apparatus that transmits the beacon.

At this point, since user information corresponds to personal information, it is also possible to limit the forwarding of user information to other wireless communication apparatuses. For example, limit information for imposing a forwarding limit on user information may be stored in the user ID fields [0] to [Q] 524. This limit information may be stored as, for example, information indicating whether the forwarding of user information is allowed or not allowed, and information indicating an available forwarding count (for example, one time) when the forwarding of user information is allowed. Herein, it is anticipated that user information includes information that may be forwarded and information that should be kept private (information for which forwarding is undesirable). For example, among the user information, it is anticipated that some users may allow a nickname to be forwarded and become known to other users, but not want their real name to be forwarded and become known to other users. In addition, it is anticipated that some users may allow their real name to be forwarded and become known to other users, but not want their birthday or address to be forwarded and become known to other users. In this way, since the privacy level differs depending on the user, it is possible to store, as the limit information, information (privacy information) for specifying the content that should be kept private when the forwarding of user information is allowed. Subsequently, among the user information, content specified by the privacy information may not be forwarded, while other information may be forwarded.

In addition, a wireless communication apparatus that receives discovery information including the user ID fields [0] to [Q] 524 storing limit information judges, on the basis of the limit information, whether or not to forward the user information included in the discovery information. Also, if privacy information is stored as the limit information, the user information to be forwarded is limited according to the content. As another example, it is also possible to store limit information indicating that forwarding is allowed on the condition that a match is determined at the destination wireless communication apparatus. In this case, user information is transmitted among friends as discovery information, for example.

Here, an example of communication of the discovery information. For example, if the second wireless communication apparatus 102 to the fourth wireless communication apparatus 104 illustrated in FIG. 1 receive discovery information from the first wireless communication apparatus 200, each apparatus itself operates as a relay node in a multi-hop relay. Consequently, the second wireless communication apparatus 102 to the fourth wireless communication apparatus 104 are able to inform relay destinations of the services that the first wireless communication apparatus 200 is able to provide. In other words, discovery information transmitted by the second wireless communication apparatus 102 and the fourth wireless communication apparatus 104 may partially include services that are provided from the first wireless communication apparatus 200.

By repeatedly transmitting and receiving discovery information in this way, it becomes possible to provide discovery information about the first wireless communication apparatus 200 to every corner of the network. In other words, by including discovery information in a periodically transmitted beacon, each wireless communication apparatus is able to announce providable services to nearby wireless communication apparatuses. In addition, by receiving beacons, each wireless communication apparatus is able to discover wireless communication apparatuses present nearby, and at the same time also detect which services are being provided by the discovered wireless communication apparatuses.

Meanwhile, by limiting the packet forwarding count as discussed above, it is possible to limit the communication peers able that the first wireless communication apparatus 200 may connect to. In this way, by limiting the forwarding count, the range over which to transmit discovery information about the first wireless communication apparatus 200 may be adjusted. Consequently, overhead may be decreased.

[Example of Transmitting and Receiving Discovery Information]

Figure 19:
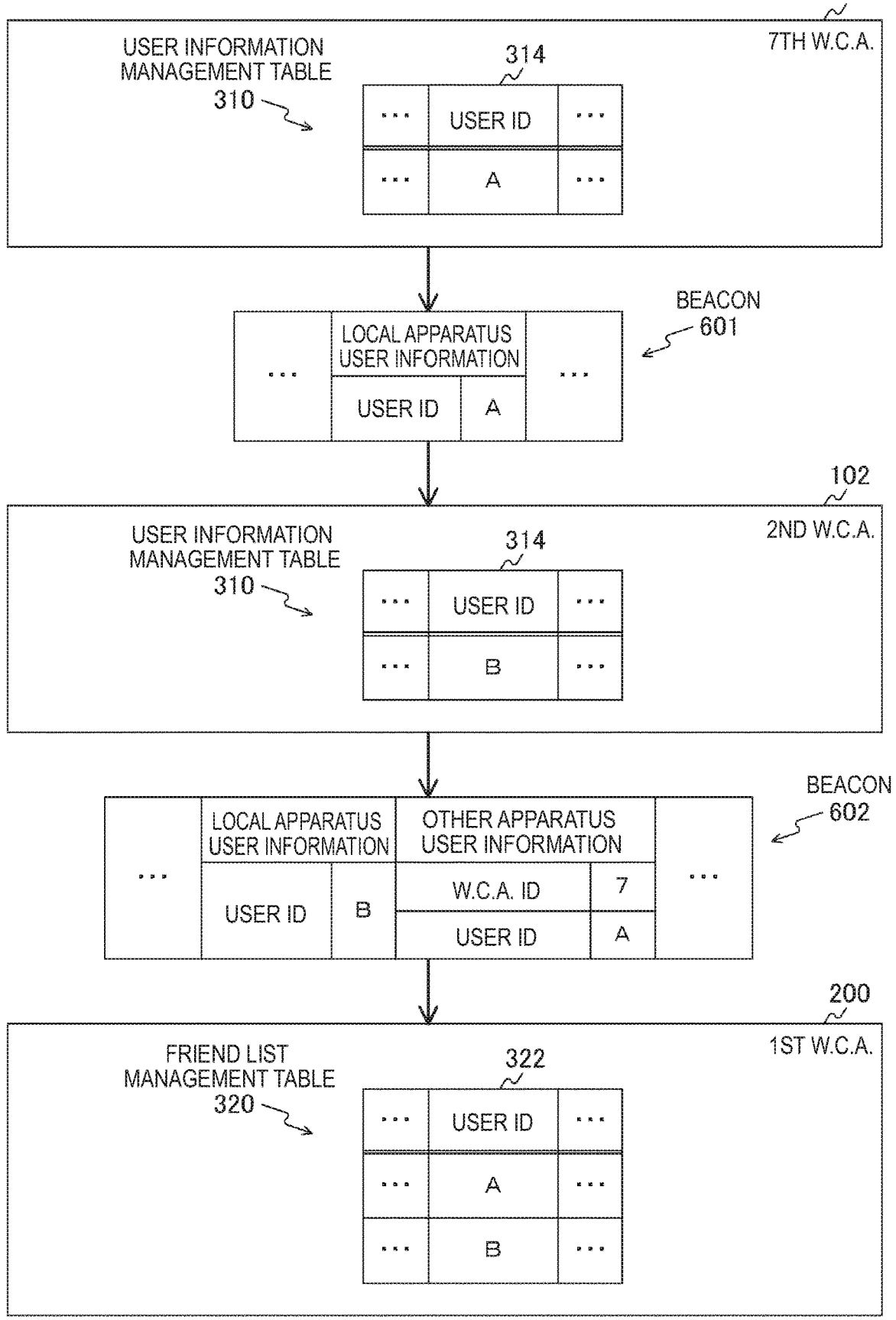
FIG. 19 is a diagram that schematically illustrates a flow of discovery information transmitted and received in a communication system 100 according to the second embodiment of the present technology.

FIG. 19 is a diagram that schematically illustrates a flow of discovery information transmitted and received in a communication system 100 according to the second embodiment of the present technology. FIG. 19 schematically illustrates a flow for a case in which discovery information (included in a beacon) is transmitted in order from the seventh wireless communication apparatus 107, to the second wireless communication apparatus 102, to the first wireless communication apparatus 200. Also, FIG. 19 illustrates an example of transmitting and receiving in the case in which a forwarding limit is not imposed on the user information.

The beacon 601 indicates a beacon transmitted by the seventh wireless communication apparatus 107 to the second wireless communication apparatus 102, while the beacon 602 indicates a beacon transmitted by the second wireless communication apparatus 102 to the first wireless communication apparatus 200.

For example, suppose that "A" is stored in the user ID 314 of the user information management table 310 of the seventh wireless communication apparatus 107, and "B" is stored in the user ID 314 of the user information management table 310 of the second wireless communication apparatus 102. In addition, suppose that "A" and "B" are stored in the user ID 322 of the friend list management table 320 of the first wireless communication apparatus 200.

In this case, the first wireless communication apparatus 200 is able to determine a match for both the user ID "A" provided in the seventh wireless communication apparatus 107 and the user ID "B" provided in the second wireless communication apparatus 102. However, since the first wireless communication apparatus 200 and the seventh wireless communication apparatus 107 do not communicate directly, with the discovery information illustrated in the first embodiment of the present technology, the user ID "A" of the seventh wireless communication apparatus 107 cannot be transmitted to the first wireless communication apparatus 200. Accordingly, in the second embodiment of the present technology, the user ID "A" provided in the seventh wireless communication apparatus 107 is transmitted to the first wireless communication apparatus 200 via the second wireless communication apparatus 102 as other apparatus user information 504. Consequently, the first wireless communication apparatus 200 is able to conduct a determination process on the user ID "A" provided in the seventh wireless communication apparatus 107, and received a service from the seventh wireless communication apparatus 107 via the second wireless communication apparatus 102.

First, the control unit 240 of the seventh wireless communication apparatus 107 generates discovery information (local apparatus user information 503 (user ID: A)) on the basis of the user ID stored in the user information management table 310 of the seventh wireless communication apparatus 107. Next, the control unit 240 of the seventh wireless communication apparatus 107 includes the generated discovery information (local apparatus user information 503 (user ID: A)) in the beacon 601, and transmits to the second wireless communication apparatus 102. In this case, service information related to a service provided by the seventh wireless communication apparatus 107 is transmitted as the local apparatus service information 501.

The control unit 240 of the second wireless communication apparatus 102 receives the beacon 601, and conducts a determination process on the basis of the discovery information (local apparatus user information 503 (user ID: A)) included in the received beacon 601. Note that since the determination process is similar to the first embodiment of the present technology, a description herein will be omitted.

In addition, the control unit 240 of the second wireless communication apparatus 102 temporarily stores the local apparatus user information 503 (user ID: A) included in the received beacon 601 in the memory 300 of the second wireless communication apparatus 102. In this case, the local apparatus service information 501 included in the received beacon 601 is also temporarily stored in the memory 300 of the second wireless communication apparatus 102.

In addition, the control unit 240 of the second wireless communication apparatus 102 generates discovery information on the basis of the user ID stored in the user information management table 310 of the second wireless communication apparatus 102. At this point, in the example illustrated in FIG. 19, "B" is stored in the user ID 314 of the user information management table 310. For this reason, the second wireless communication apparatus 102 includes discovery information related to the user ID "A" temporarily stored in the memory 300 and the user ID "B" stored in the user information management table 310 in the beacon 602, and transmits to the first wireless communication apparatus 200. In other words, the user ID "A" provided in the seventh wireless communication apparatus 107 is transmitted as the other apparatus user information 504, and the user ID "B" provided in the second wireless communication apparatus 102 is transmitted as the local apparatus user information 503. In addition, service information related to a service provided by the seventh wireless communication apparatus 107 is transmitted as the other apparatus service information 502, and a service provided by the second wireless communication apparatus 102 is transmitted as the local apparatus service information 501.

The control unit 240 of the first wireless communication apparatus 200 receives the beacon 602, and conducts a determination process on the basis of the discovery information (local apparatus user information 503 (user ID: A), other apparatus user information 504 (user ID: B)) included in the received beacon 602. In this case, the control unit 240 of the first wireless communication apparatus 200 conducts a determination process on each of the local apparatus user information 503 (user ID: A) and the other apparatus user information 504 (user ID: B). In other words, a match determination is conducted on each of the user ID "A" provided in the seventh wireless communication apparatus 107 and the user ID "B" provided in the second wireless communication apparatus 102.

As illustrated in FIG. 19, "A" and "B" are stored in the user ID 322 of the friend list management table 320 of the first wireless communication apparatus 200. For this reason, each of the user ID "A" provided in the seventh wireless communication apparatus 107 and the user ID "B" provided in the second wireless communication apparatus 102 are determined to match the user ID 322 of the friend list management table 320. In this case, the first wireless communication apparatus 200 is able to receive a service from the second wireless communication apparatus 102, and also receive a service from the seventh wireless communication apparatus 107 via the second wireless communication apparatus 102.

In addition, the control unit 240 of the first wireless communication apparatus 200 temporarily stores the local apparatus user information 503 (user ID: A) and the other apparatus user information 504 (user ID: B) included in the received beacon 602 in the memory 300. Subsequently, the control unit 240 includes and transmits discovery information related to the user ID stored in the user information management table 310 and the temporarily stored user IDs "A" and "B" (local apparatus user information 503, other apparatus user information 504) in a beacon. Also, respective service information is similarly included in the beacon and transmitted.

In this way, the control unit 240 associates service information and user information, and includes and transmits the associated information in discovery information. For example, it is possible to associate and transmit service information for identifying a service provided by at least one of the first wireless communication apparatus 200 and another wireless communication apparatus with user information for identifying a user who uses a wireless communication apparatus that provides the service. In this case, for example, it is possible to associate and transmit user information related to a user who uses the first wireless communication apparatus 200 (first user information) and user information included in discovery information transmitted from another wireless communication apparatus (second user information). At this point, for the second user information, only second user information for which forwarding is allowed may be included in the discovery information and transmitted.

In this way, in an embodiment of the present technology, when nearby wireless communication apparatuses communicate with each other, discovery information, including service information and associated user information for identifying a user who uses a wireless communication apparatus that provides the service, is transmitted and received. By exchanging service information in this way, a service provided by the local apparatus or another apparatus may be reported efficiently to a nearby wireless communication apparatus. In addition, since user information is associated with the service information and transmitted, a user who uses a wireless communication apparatus that provides a service may be identified, making it possible to easily and efficiently judge which wireless communication apparatuses are trustworthy. For example, when the user identified by the user information is in one's own circle (a friend or acquaintance), the wireless communication apparatus used by that user may be judged to be trustworthy. As a result, it is possible to easily and safely exchange services using wireless communication among nearby wireless communication apparatuses.

The above-described embodiments are examples for embodying the present technology, and matters in the embodiments each have a corresponding relationship with disclosure-specific matters in the claims. Likewise, the matters in the embodiments and the disclosure-specific matters in the claims denoted by the same names have a corresponding relationship with each other. However, the present technology is not limited to the embodiments, and various modifications of the embodiments may be embodied in the scope of the present technology without departing from the spirit of the present technology.

The processing sequences that are described in the embodiments described above may be handled as a method having a series of sequences or may be handled as a program for causing a computer to execute the series of sequences and recording medium storing the program. As the recording medium, a hard disk, a CD (Compact Disc), an MD (Mini-Disc), and a DVD (Digital Versatile Disk), a memory card, and a Blu-ray disc (registered trademark) can be used.

Additionally, the present technology may also be configured as below.

(1)

A wireless communication apparatus including:

a communication unit configured to use wireless communication to transmit and receive data related to a service provided by at least one of the wireless communication apparatus and another wireless communication apparatus with other wireless communication apparatuses present within a designated range; and a control unit configured to associate service information for identifying the service with user information for identifying a user using a wireless communication apparatus that provides the service, and include and transmit the associated information in the data.

(2)

The wireless communication apparatus according to (1), wherein when the data is received, the control unit judges, on the basis of the user information included in the data, whether or not to receive a service according to the service information associated with the user information from another wireless communication apparatus according to the user information.

(3)

The wireless communication apparatus according to (2), wherein the control unit judges whether or not to receive the service, on the basis of whether or not the user information included in the received data matches the user information registered in an allow list.

(4)

The wireless communication apparatus according to (3), wherein the control unit judges whether or not to receive the service, on the basis of a result of a match determination using the allow list stored in a storage unit or the allow list stored in an external apparatus.

(5)

The wireless communication apparatus according to any one of (2) to (4), wherein the control unit judges whether or not to receive the service, on the basis of whether or not the user information included in the received data matches the user information registered in a blocked list.

(6)

The wireless communication apparatus according to any one of (1) to (5), wherein the control unit includes, in the data, and transmits first user information which is the user information according to a user using the wireless communication apparatus, and second user information which is the user information included in the data transmitted from another wireless communication apparatus, and also the user information according to a user using the other wireless communication apparatus.

(7)

The wireless communication apparatus according to (6), wherein the control unit includes only the second user information for which forwarding is allowed in the data and transmits the data.

(8)

A wireless communication apparatus including:

a communication unit configured to transmit and receive data related to a service provided by at least one of the wireless communication apparatus and another wireless communication apparatus, the data including information associating service information for identifying the service with user information for identifying a user using a wireless communication apparatus that provides the service; and a control unit that, when the data is received, judges, on the basis of the user information included in the data, whether or not to receive a service according to the service information associated with the user information from another wireless communication apparatus according to the user information.

(9)

A communication system including:

a first wireless communication apparatus provided with a communication unit configured to use wireless communication to transmit and receive data related to a service provided by at least one of the wireless communication apparatus and another wireless communication apparatus with other wireless communication apparatuses present within a designated range, and a control unit configured to associate service information for identifying the service with user information for identifying a user using a wireless communication apparatus that provides the service, and include and transmit the associated information in the data; and a second wireless communication apparatus provided with a communication unit that transmits and receives the data, and a control unit that, when the data is received, judges, on the basis of the user information included in the data, whether or not to receive a service according to the service information associated with the user information from another wireless communication apparatus according to the user information.

(10)

A wireless communication apparatus control method including:

a communicating step of using wireless communication to transmit and receive data related to a service provided by at least one of the wireless communication apparatus and another wireless communication apparatus with other wireless communication apparatuses present within a designated range; and a controlling step of associating service information for identifying the service with user information for identifying a user using a wireless communication apparatus that provides the service, and including and transmitting the associated information in the data.

(11)

A program causing a computer to execute:

a communicating step of using wireless communication to transmit and receive data related to a service provided by at least one of the wireless communication apparatus and another wireless communication apparatus with other wireless communication apparatuses present within a designated range; and a controlling step of associating service information for identifying the service with user information for identifying a user using a wireless communication apparatus that provides the service, and including and transmitting the associated information in the data.

REFERENCE SIGNS LIST 100 communication system
102 second wireless communication apparatus
103 third wireless communication apparatus
104 fourth wireless communication apparatus
105 fifth wireless communication apparatus
106 sixth wireless communication apparatus
107 seventh wireless communication apparatus
108 eighth wireless communication apparatus
109 ninth wireless communication apparatus
110 10th wireless communication apparatus
111 11th wireless communication apparatus
112 12th wireless communication apparatus
113 13th wireless communication apparatus
200 first wireless communication apparatus
210 antenna
220 communication unit
230 I/O interface
240 control unit
250 bus
260 movement detection unit
270 operation receiving unit
280 display unit
290 audio output unit
300 memory
400 communication system
410 friend list management server
411 friend list management database
412 determination unit
420 public network
430 communication control apparatus
431 base station

The invention claimed is:

1. A first wireless communication apparatus, comprising:
circuitry configured to:
    connect to a wireless mesh network with a plurality of wireless communication apparatuses;
    receive a first signal from a second wireless communication apparatus,
        wherein the received first signal includes first user information related to a user of the second wireless communication apparatus;

store a block list generated based on the first user information and a service of a plurality of services; and control to prohibit communication for the service between the wireless mesh network and the second wireless communication apparatus based on a result of a comparison between the first user information and the block list, wherein the first user information is included in the block list of the service.

2. The first wireless communication apparatus according to claim 1, wherein:

the circuitry is further configured to determine, based on the first user information included in the received first signal, whether to receive a second signal associated with at least one service of the plurality of services provided by the second wireless communication apparatus, and the second signal is received from the second wireless communication apparatus.

3. The first wireless communication apparatus according to claim 2, wherein the circuitry is further configured to determine whether to receive the second signal associated with the at least one service based on the result of the comparison.

4. The first wireless communication apparatus according to claim 1, wherein the block list is stored in one of the first wireless communication apparatus or an external apparatus.

5. The first wireless communication apparatus according to claim 1, wherein:

the first user information includes at least one user identifier class, the at least one user identifier class indicates a class of a corresponding user identifier of a plurality of user identifiers, and the at least one user identifier class is based on a unique identifier.

6. A method, comprising:

in a first wireless communication apparatus of a plurality of wireless communication apparatuses:

connecting to a wireless mesh network with the plurality of wireless communication apparatuses;

receiving a first signal from a second wireless communication apparatus, wherein the received first signal includes first user information related to a user of the second wireless communication apparatus;

storing a block list generated based on the first user information and a service of a plurality of services; and controlling to prohibit communication for the service between the wireless mesh network and the second wireless communication apparatus based on a result of a comparison between the first user information and the block list, wherein the first user information is included in the block list of the service.

7. The method according to claim 6, further comprising:

determining, based on the first user information included in the received first signal, whether to receive a second signal associated with at least one service of the plurality of services provided by the second wireless communication apparatus, wherein the second signal is received from the second wireless communication apparatus.

8. The method according to claim 7, further comprising determining whether to receive the second signal associated with the at least one service based on the result of the comparison.

9. The method according to claim 6, wherein the block list is stored in one of the first wireless communication apparatus or an external apparatus.

10. The method according to claim 6, wherein:

the first user information includes at least one user identifier class, the at least one user identifier class indicates a class of a corresponding user identifier of a plurality of user identifiers, and the at least one user identifier class is based on a unique identifier.

* * * * *